United States Patent
Ota et al.

(10) Patent No.: US 6,434,956 B1
(45) Date of Patent: Aug. 20, 2002

(54) CONTROL VALVE AND METHOD FOR CONTROLLING AN AIR-CONDITIONING SYSTEM

(75) Inventors: Masaki Ota; Masahiro Kawaguchi; Ken Suitou; Ryo Matsubara; Taku Adaniya, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/632,964

(22) Filed: Aug. 4, 2000

(30) Foreign Application Priority Data

Aug. 4, 1999 (JP) ............................................ 11-221673
Nov. 22, 1999 (JP) ............................................ 11-331874

(51) Int. Cl.$^7$ ............................... B60H 1/32; F25B 1/00
(52) U.S. Cl. ...................... 62/133; 62/228.3; 417/222.2
(58) Field of Search ............................ 62/228.3, 228.5, 62/133; 417/222.2

(56) References Cited

U.S. PATENT DOCUMENTS 4,905,477 A * 3/1990 Takai .................... 62/228.5 Y
6,170,277 B1 * 1/2001 Porter et al. ................ 62/228.3

FOREIGN PATENT DOCUMENTS

| EP | 0 707 182 A2 | 4/1996 | ........... F25B/31/02 |
|---|---|---|---|
| EP | 0 894 651 A2 | 2/1999 | ........... B60H/1/00 |
| EP | 1 083 335 A2 | 3/2001 | ........... F04B/27/18 |
| JP | 406180155 | * 6/1994 | ................ 62/228.3 |
| JP | 6-341378 | 12/1994 | |
| JP | 8-21365 | 1/1996 | ........... F04B/49/00 |
| JP | 8-312530 | 11/1996 | ........... F04B/27/14 |
| JP | 10-169552 | 6/1998 | ........... F04B/27/14 |
| JP | WO 99/06700 | 2/1999 | ........... F04B/49/00 |

* cited by examiner

Primary Examiner—William Wayner
(74) Attorney, Agent, or Firm—Morgan & Finnegan, LLP

(57) ABSTRACT

An air-conditioning system has a refrigerant circuit. The circuit includes a condenser, a expansion valve, an evaporator and a variable displacement compressor. The system has a pressure difference detector. The pressure difference detector detects the pressure difference between two pressure monitoring points located on the refrigerant circuit. A control valve and a controller control the displacement of the compressor in accordance with the pressure difference detected by the pressure difference detector. This permits the displacement of the compressor to be quickly changed.

31 Claims, 23 Drawing Sheets

CONTROL VALVE AND METHOD FOR CONTROLLING AN AIR-CONDITIONING SYSTEM

BACKGROUND OF THE INVENTION

The present invention relates to an air-conditioning system having a refrigeration circuit. More particularly, the present invention pertains to a method for controlling the displacement of a variable displacement compressor and to a control valve used in a variable displacement compressor.

A refrigeration circuit of a typical vehicle air-conditioning system includes a condenser, an expansion valve, which functions as a decompression device, an evaporator and a compressor. The compressor draws refrigerant gas from the evaporator and compresses the gas. The compressor then discharges the gas to the condenser. The evaporator performs heat exchange between the refrigerant in the circuit and air in the passenger compartment. Heat from air that flows about the evaporator is transferred to the refrigerant flowing through the evaporator in accordance with the thermal load or the cooling load. The pressure of the refrigerant gas at the outlet of the evaporator represents the magnitude of the thermal load.

A vehicle variable displacement swash plate type compressor has a displacement control mechanism for setting the pressure (suction pressure Ps) in the vicinity of the outlet of the evaporator to a predetermined target suction pressure. The mechanism adjusts the compressor displacement by changing the inclination angle of the swash plate such that the flow rate of refrigerant corresponds to the cooling load. To control the displacement, a control valve is used. The control valve includes a pressure sensing member, which is a bellows or a diaphragm. The pressure sensing member detects the suction pressure Ps. A valve opening is adjusted in accordance with the displacement of the pressure sensing member, which changes the pressure in a crank chamber, or crank pressure Pc.

A simple control valve that controls a single target suction pressure cannot control the air conditioning performance accurately. Therefore, an electromagnetic control valve that changes a target suction pressure in accordance with an external current has been introduced. Such a control valve includes an electromagnetic actuator such as a solenoid. The actuator changes force acting on a pressure sensing member in accordance with an external current to adjust a target suction pressure.

A typical on-vehicle compressor is driven by an engine. A compressor is one of the devices that consume most of the power (or the torque) of an engine. Therefore, when the load on the engine is great, for example, when the vehicle is accelerating or moving uphill, the compressor displacement is minimized to reduce the engine load. Specifically, the value of current supplied to the electromagnetic control valve is controlled for setting the target suction pressure to a relatively great value. Accordingly, to increase the actual suction pressure toward the target suction pressure, the control valve operates such that the compressor displacement is minimized.

A graph of FIG. 22 illustrates the relationship between a suction pressure Ps and the displacement Vc of a compressor. The relationship is represented by multiple lines in accordance with the thermal load in an evaporator. Thus, if a level Ps1 is set as a target suction pressure Pset, the actual displacement Vc varies in a certain range ($\Delta$Vc in FIG. 22) due to the thermal load. For example, when an excessive thermal load is applied to the evaporator, an increase of the target suction pressure Pset may not decrease the engine load. That is, even if the target suction pressure Pset is raised, the compressor displacement Vc will not be lowered to a level that reduces the engine load unless the thermal load on the evaporator is relatively small.

The suction pressure Ps represents the thermal load on an evaporator. The method for controlling the displacement of a variable displacement compressor based on the suction pressure Ps is appropriate for maintaining the temperature in a vehicle compartment at a comfortable level. However, to quickly decrease the displacement, the displacement control based only on the suction pressure Ps is not always appropriate. For example, the displacement control based on the suction pressure Ps is not suitable for the above described displacement limiting control procedure, in which the displacement must be quickly decreased to secure the engine power.

SUMMARY OF THE INVENTION

Accordingly, it is an objective of the present invention to provide an air-conditioning system that rapidly changes the displacement of a compressor. Particularly, the objective of the present invention is to provide a method for controlling a variable displacement compressor and a control valve of a variable displacement compressor that stabilizes the temperature of a vehicle passenger compartment and be quickly changed to secure the engine power.

To achieve the above objective, the present invention provides an air-conditioning system having a refrigerant circuit. The circuit includes a condenser, a decompression device, an evaporator and a variable displacement compressor. The system comprises a pressure difference detector for detecting the pressure difference between two pressure monitoring points located on the refrigerant circuit, and means for controlling the displacement of the compressor in accordance with the pressure difference detected by the pressure difference detector.

To achieve the above objective, the present invention also provides a method for controlling the displacement of a variable displacement compressor in a refrigerant circuit of a vehicle air-conditioning system. The method comprises selecting a control mode from a plurality of modes including a normal displacement control mode and a specific displacement control mode, changing the displacement of the compressor such that the pressure difference between two pressure monitoring points, which are located in the refrigerant circuit, approaches a target pressure difference that reflects the temperature of a passenger compartment when the normal displacement control mode is selected, and controlling the compressor to have a predetermined displacement when the specific displacement control is selected.

To achieve the above objective, the present invention also provides a control valve used for a variable displacement compressor. The compressor is a part of a refrigerant circuit. The compressor includes a crank chamber, a drive plate accommodated in the crank chamber, a supply passage for connecting a discharge pressure zone to the crank chamber, and a bleed passage for connecting a suction pressure zone to the crank chamber. The inclination angle of the drive plate varies in accordance with the pressure in the crank chamber thereby controlling the displacement of the compressor. The control valve comprises a valve housing. A valve chamber is defined in the valve housing to form part of the supply passage or the bleed passage. A movable valve body is located in the valve chamber to adjust opening size of the supply passage or the bleed passage. A pressure difference detector detects the pressure difference between two pressure monitoring points located in the refrigerant circuit. The position of the valve body is affected by based on a force produced by the detected pressure difference. An actuator applies a force to the pressure difference detector, wherein the actuator changes a target pressure difference according to the external command.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A vehicle air-conditioning system according to a first embodiment of the present invention will now be described with reference to FIGS. 1 to 10.

Figure 1:
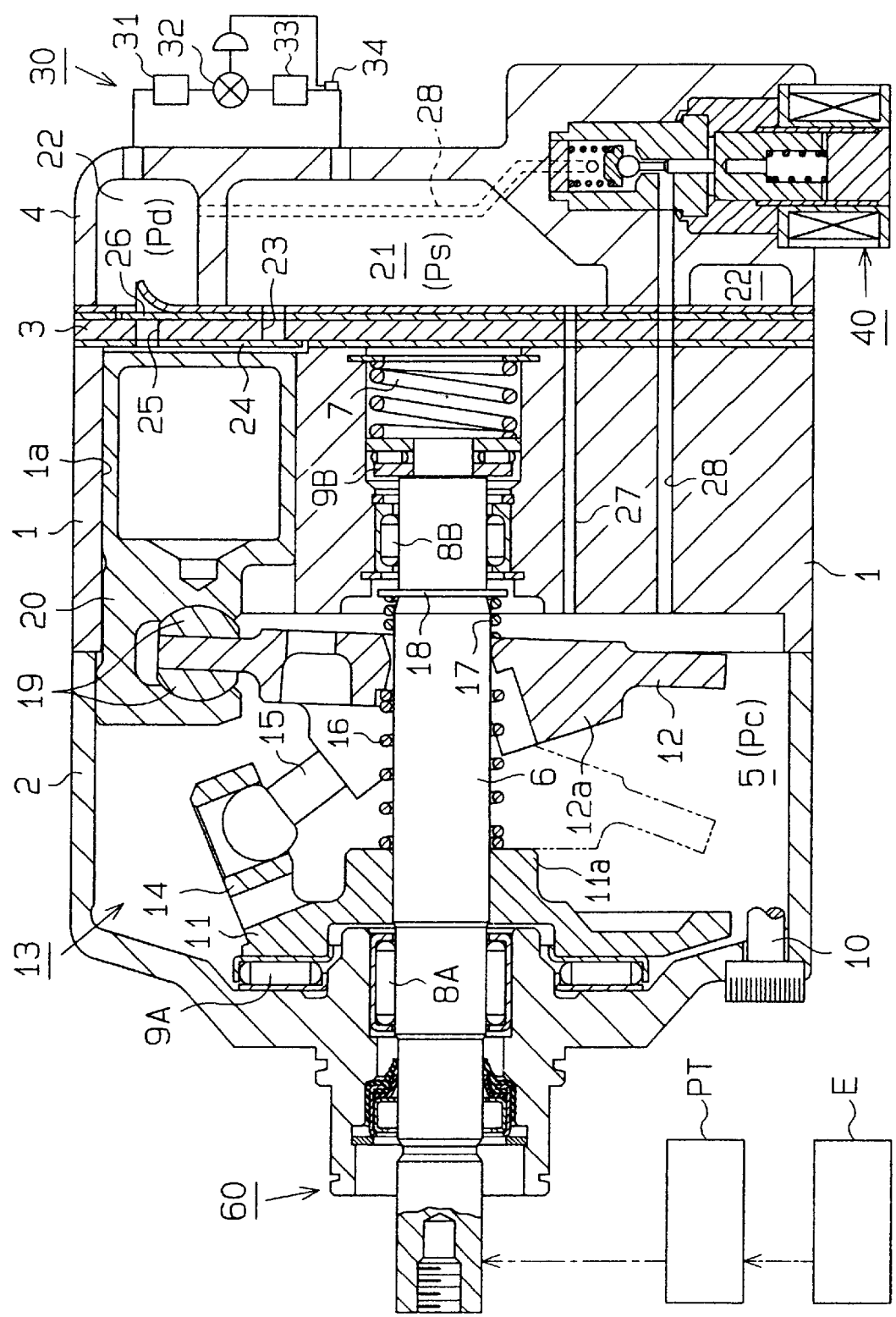
FIG. 1 is a cross-sectional view illustrating a swash plate type variable displacement compressor according to a first embodiment.

FIG. 1 illustrates a refrigeration circuit of a vehicle air-conditioning system. The refrigeration circuit has a swash plate type variable displacement compressor and an external refrigeration circuit 30. The refrigeration circuit 30 includes, for example, a condenser 31, an expansion valve 32 and an evaporator 33. The opening of the expansion valve 32 is feedback-controlled based on the temperature detected by a heat sensitive tube 34 at the outlet of the evaporator 33. The expansion valve 32 supplies refrigerant, the amount of which corresponds to the thermal load on the evaporator 33, to regulate the flow rate. The compressor draws refrigerant gas from the downstream portion of the refrigeration circuit 30 and compresses the gas. The compressor then discharges the compressed gas to the upstream portion of the circuit 30.

The compressor shown in FIG. 1 is a swash plate type variable displacement compressor, or reciprocal piston (20) type compressor. The compressor includes a cylinder block 1, a front housing member 2, which is secured to the front end face of the cylinder block 1, and a rear housing member 4, which is secured to the rear end face of the cylinder block 1. A valve plate 3 is located between the cylinder block 1 and the rear housing member 4. The cylinder block 1, the front housing member 2, the valve plate 3 and the rear housing member 4 are secured to one another by bolts 10 (only one is shown) to form the compressor housing. In FIG. 1, the left end of the compressor is defined as the front end, and the right end of the compressor is defined as the rear end.

A crank chamber 5 is defined between the cylinder block 1 and the front housing member 2. A drive shaft 6 extends through the crank chamber 5 and is supported through radial bearings 8A, 8B by the housing. A recess is formed in the center of the cylinder block 1. A spring 7 and a rear thrust bearing 9B are located in the recess. A lug plate 11 is secured to the drive shaft 6 in the crank chamber 5 to rotate integrally with the drive shaft 6. A front thrust bearing 9A is located between the lug plate 11 and the inner wall of the front housing member 2. A rear thrust bearing 9B is located adjacent to the rear end of the drive shaft 6. The drive shaft 6 is supported in the axial direction by the rear bearing 9B, which is urged forward by the spring 7, and the front bearing 9A.

The front end of the drive shaft 6 is connected to an external drive source, which is an engine E in this embodiment, through a power transmission mechanism PT. In this embodiment, the power transmission mechanism PT is a clutchless mechanism that includes, for example, a belt and a pulley. Alternatively, the mechanism PT may be a clutch mechanism (for example, an electromagnetic clutch) that selectively transmits power when supplied with a current.

A drive plate, which is a swash plate 12 in this embodiment, is accommodated in the crank chamber 5. The swash plate 12 has a hole formed in the center. The drive shaft 6 extends through the hole in the swash plate 12. The swash plate 12 is coupled to the lug plate 11 by a guide mechanism, which is a hinge mechanism 13 in this embodiment. The hinge mechanism 13 includes two support arms 14 (only one is shown) and two guide pins 15 (only one is shown). Each support arm 14 projects from the rear side of the lug plate 11. Each guide pin 15 projects from the swash plate 12. The swash plate 12 to rotate integrally with the lug plate 11 and drive shaft 6. The swash plate 12 slides along the drive shaft 6 and tilts with respect to the axis of the drive shaft 6. The swash plate 12 has a counterweight 12a located at the opposite side of the drive shaft 6 from the drive hinge mechanism 13.

A spring 16 is located between the lug plate 11 and the swash plate 12. The spring 16 urges the swash plate 12 toward the cylinder block 1, or in the direction decreasing the inclination of the swash plate 12. The inclination of the swash plate 12 is referred to as angle θ formed by the swash plate 12 and a plane perpendicular to the drive shaft 6. A stopper ring 18 is fixed on the drive shaft 6 behind the swash plate 12. A spring 17 is fitted about the drive shaft 6 between the stopper ring 18 and the swash plate 12. When the inclination angle θ is great as shown by the broken line in FIG. 1, the spring 17 does not apply force to the swash plate 12. When the inclination angle θ is small as shown by the solid line in FIG. 1, the spring 17 is compressed between the stopper ring 18 and the swash plate 12 and urges the swash plate 12 away from the cylinder block 1, or in a direction increasing the inclination angle θ. The normal length of the spring 17 and the location of the stopper ring 18 are determined such that the spring 17 is not fully contracted when the swash plate 12 is inclined by the minimum inclination angle θmin (for example, an angle from one to five degrees).

Cylinder bores 1a (only one shown) are formed in the cylinder block 1. The cylinder bores 1a are arranged at equal angular intervals about the drive shaft 6. The rear end of each cylinder bore 1a is blocked by the valve plate 3. A single headed piston (20) 20 is reciprocally accommodated in each cylinder bore 1a. Each piston (20) 20 and the corresponding cylinder bore 1a define a compression chamber, the volume of which is changed according to reciprocation of the piston (20) 20. The front portion of each piston (20) 20 is coupled to the swash plate 12 by a pair of shoes 19. Therefore, rotation of the swash plate 12 reciprocates each piston (20) 20 by a stroke that corresponds to the angle θ.

A suction chamber 21 and a discharge chamber 22 are defined between the valve plate 3 and the rear housing member 4. The discharge chamber 22 surrounds the suction chamber 21. The valve plate 3 has suction ports 23 and discharge ports 25, which correspond to each cylinder bore 1a. The valve plate 3 also has suction valve flaps 24, each of which corresponds to one of the suction ports 23, and discharge valve flaps 26, each of which corresponds to one of the discharge ports 25. The suction ports 23 connect the suction chamber 21 with the cylinder bores 1a. The discharge ports 25 connect the cylinder bores 1a with the discharge chamber 22.

When each piston (20) 20 moves from the top dead center position to the bottom dead center position, refrigerant gas in the suction chamber 21, which is a suction pressure zone, flows into the corresponding cylinder bore 1a via the corresponding suction port 23 and suction valve 24. When each piston (20) 20 moves from the bottom dead center position to the top dead center position, refrigerant gas in the corresponding cylinder bore 1a is compressed to a predetermined pressure and is discharged to the discharge chamber 22, which is a discharge pressure zone, via the corresponding discharge port 25 and discharge valve 26.

Power of the engine E is transmitted to and rotates the drive shaft 6. Accordingly, the swash plate 12, which is inclined by an angle θ, is rotated. Rotation of the swash plate 12 reciprocates each piston (20) 20 by a stroke that corresponds to the angle θ. As a result, suction, compression and discharge of refrigerant gas are repeated in the cylinder bores 1a.

The inclination angle θ of the swash plate 12 is determined according to various moments acting on the swash plate 12. The moments include a rotational moment, which is based on the centrifugal force of the rotating swash plate 12, a spring force moment, which is based on the force of the springs 16 and 17, a moment of inertia of the piston (20) reciprocation, and a gas pressure moment. The gas pressure moment is generated by the force of the pressure in the cylinder bores 1a and the pressure in the crank chamber 5 (crank pressure Pc). The gas pressure moment is adjusted by changing the crank pressure Pc by a displacement control valve 40, which will be discussed below. Accordingly, the inclination angle θ of the plate 12 is adjusted to an angle between the maximum inclination θmax and the minimum inclination θmin. The contact between the counterweight 12a and a stopper 11a of the lug plate 11 prevents further inclination of the swash plate 12 from the maximum inclination θmax. The minimum inclination θmin is determined based primarily on the forces of the springs 16 and 17 when the gas pressure moment is maximized in the direction in which the swash plate inclination is decreased.

Figure 2:
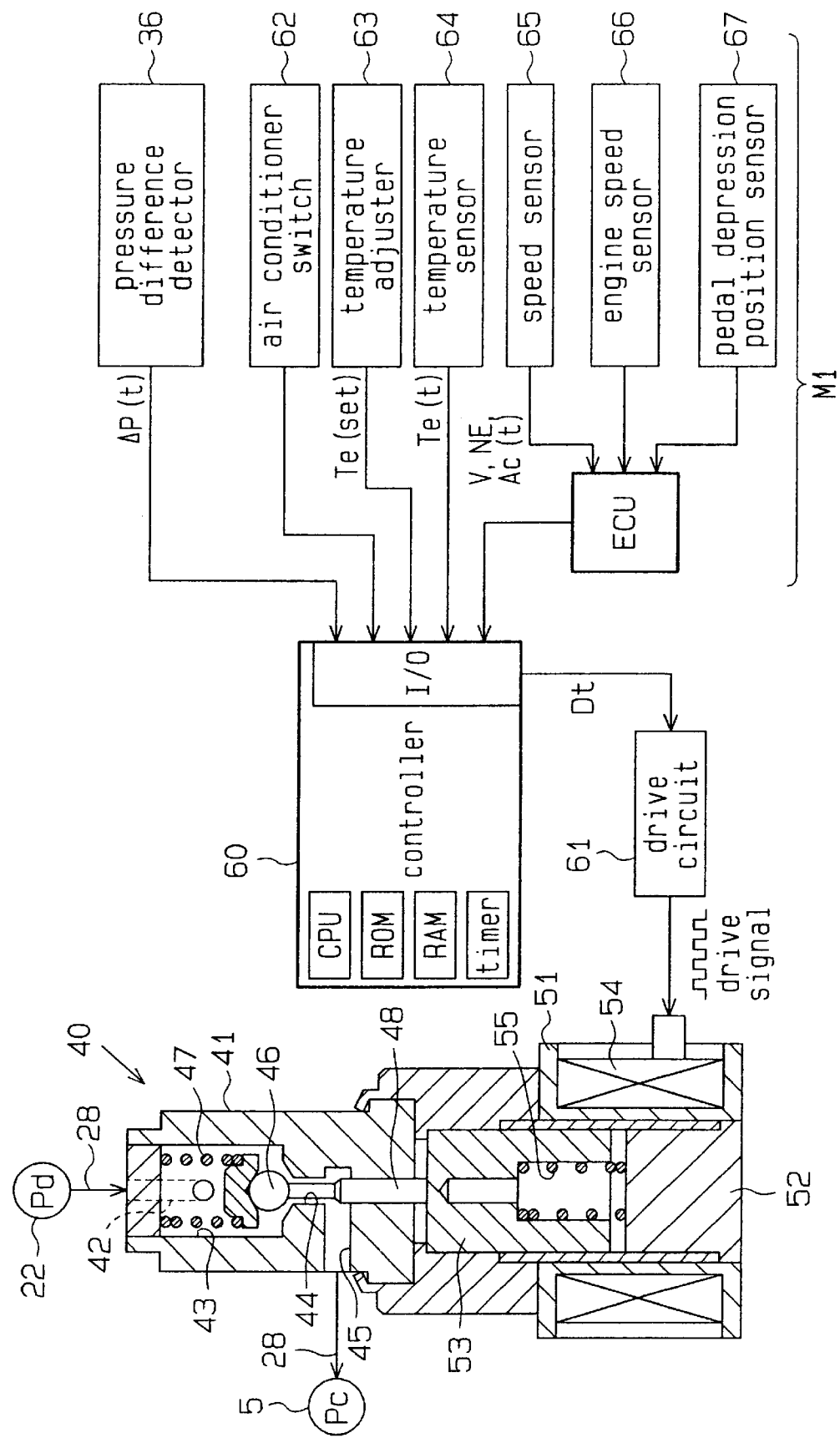
FIG. 2 is a cross-sectional view illustrating a control valve of FIG. 1.

A mechanism for controlling the crank pressure Pc includes a bleeding passage 27, a supply passage 28 and the control valve 40 as shown in FIGS. 1 and 2. The passages 27, 28 are formed in the housing. The bleeding passage 27 connects the suction chamber 21 with the crank chamber 5. The supply passage 28 connects the discharge chamber 22 with the crank chamber 5. The control valve 40 is located in the supply passage 28.

The control valve 40 changes the opening of the supply passage 28 to adjust the flow rate of refrigerant gas from the discharge chamber 22 to the crank chamber 5. The crank pressure Pc is changed in accordance with the relationship between the flow rate of refrigerant gas from the discharge chamber 22 to the crank chamber 5 and the flow rate of refrigerant gas flowing out from the crank chamber 5 to the suction chamber 21 through the bleeding passage 27. The difference between the crank pressure Pc and the pressure in the cylinder bores 1a is changed in accordance with the crank pressure Pc, which varies the inclination angle θ of the swash plate 12. This alters the stroke of each piston (20) 20 and the compressor displacement.

As shown in FIG. 2, the control valve 40 includes an inlet valve portion 41 and a solenoid portion 51. The housing of the inlet valve portion 41 has an inlet port 42, a valve chamber 43, a valve hole 44 and an outlet port 45, which form a part of the supply passage 28. A valve body 46 is housed in the valve chamber 43 to contact and separate from the valve hole 44. Also, a spring 47 is housed in the valve chamber 43 to urge the valve body 46 in a direction such that the valve hole 44 is closed.

The solenoid portion 51 includes a fixed iron core 52, a movable iron core 53, a coil 54 and a spring 55. The coil 54 is located radially outward of both the fixed core 52 and the movable core 53. A rod 48 couples the movable core 53 with the valve body 46. A spring 55 urges the valve body 46 through the movable core 53 and the rod 48 in a direction closing the valve hole 44.

When a current is supplied to the solenoid portion 51, an attraction force is generated between the cores 52 and 53. The attraction force acts against the force of the spring 55. Therefore, the position of the valve body 46 is determined by the equilibrium of the downward force, which includes the force of the spring 47 and the electromagnetic force, and the upward force, which is the force of the spring 55. The opening size of the supply passage 28 is changed by the electromagnetic force, which corresponds to the current supplied to the coil 54. The coil 54 is duty controlled in this embodiment. That is, the duty ratio of the current is varied. The coil 54 may be controlled by changing the level of supplied current. Alternatively, the coil 54 may be controlled by pulse-width-modulation. Due to the structure of the control valve 40, a smaller duty ratio Dt increases the opening sizeof the control valve 40. A greater duty ratio Dt decreases the opening size of the control valve 40.

Figure 3:
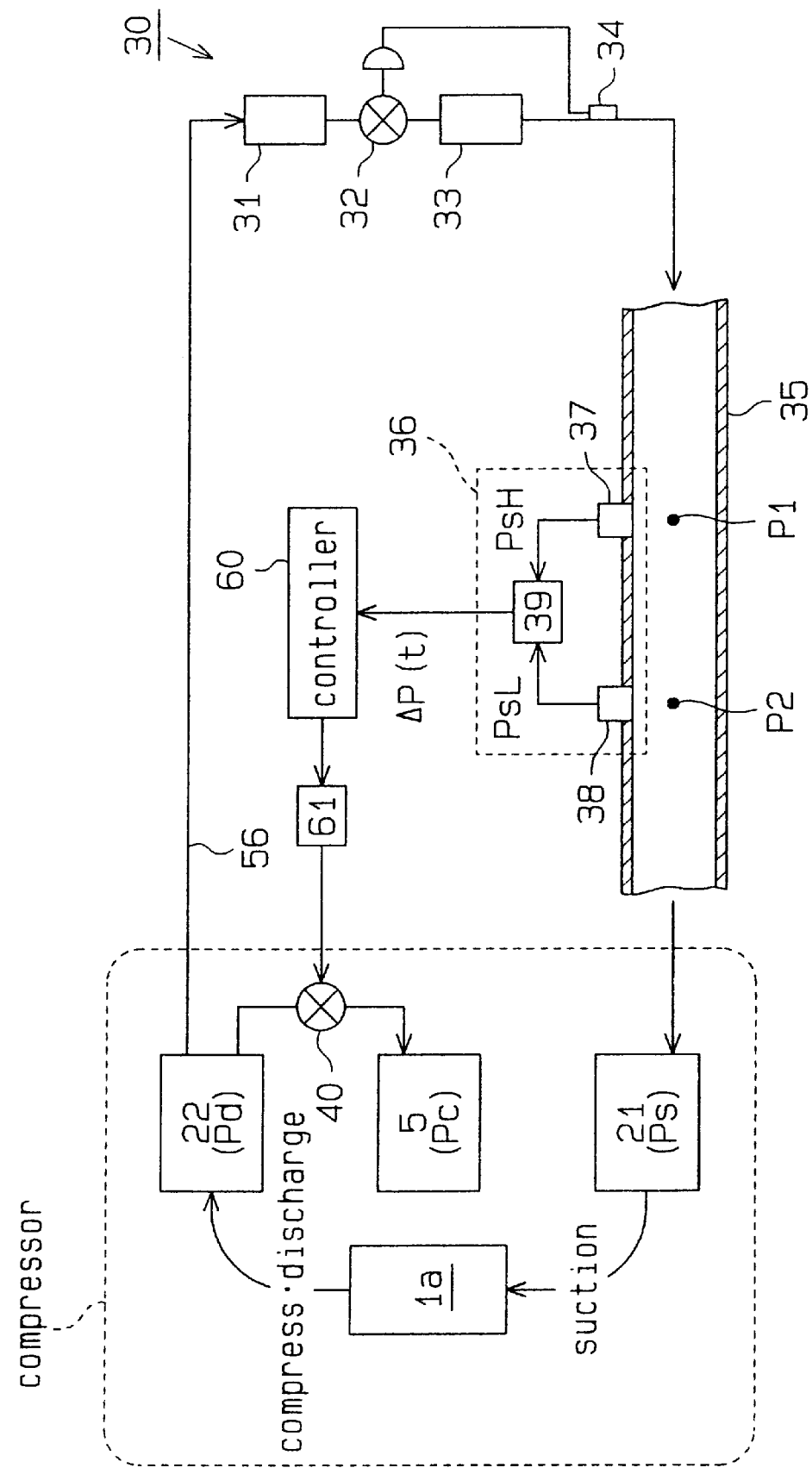
FIG. 3 is a schematic diagram illustrating a refrigeration circuit according to the first embodiment.

As shown in FIG. 3, a pipe 35 is located in the downstream portion of the external refrigeration circuit 30 to connect the outlet of the evaporator 33 to the suction chamber 21 of the compressor. A pressure difference detector 36 is located on the pipe 35. The detector 36 includes a first pressure sensor 37, a second pressure sensor 38 and a signal processor 39. The detector 36 functions as an electrical means for detecting a pressure difference. Two pressure monitoring points P1, P2 are defined in the pipe 35. The points P1 and P2 are spaced by a predetermined distance in the direction of flow. The first pressure sensor 37 detects the pressure PsH at the upstream point P1, and the second pressure sensor 38 detects the pressure PsL at the downstream point P2. The signal processor 39 receives signals regarding the pressures PsH, PsL from the sensors 37, 38 and computes the pressure difference $\Delta P(t)$. The processor 39 then sends a signal representing the pressure difference $\Delta P(t)$ to a controller 60.

The greater the displacement of the compressor is, the higher the flow rate of refrigerant in the refrigeration circuit is. The greater the flow rate of the refrigerant, the greater the pressure loss per unit length in the circuit is. That is, the pressure loss between two points in the refrigeration circuit corresponds to the flow rate of refrigerant in the circuit. Detecting the pressure difference $\Delta P(t)$ ($\Delta P(t)=PsH-PsL$) between two points P1, P2 permits the displacement of the compressor to be indirectly detected. That is, the pressure difference detector 36 detects the flow rate of refrigerant in the refrigeration circuit and the compressor displacement and outputs an electric signal representing the detected information.

The controller 60 controls the vehicle air-conditioning system. As shown in FIG. 2, the controller 60 includes a CPU, a ROM, a RAM, a timer and an input-output circuit. The ROM stores various control programs (see flowcharts of FIGS. 4 to 9) and initial data. The timer measures elapsed time based on commands from the CPU and signals when a certain period has elapsed. The input-output circuit is an interface circuit, which has input-output terminals. A drive circuit 61 is connected to the output terminals of the input-output circuits. The drive circuit 61 sends drive signals, which are duty controlled, to the coil 54 of the control valve 40 based on commands from the controller 60. The control valve 40 and the controller 60 form means for controlling the compressor displacement.

As shown in FIG. 2, the input terminal of the input-output circuit is connected to the pressure difference detector 36, an air conditioner switch 62, a temperature adjuster 63, a temperature sensor 64 and an electronic control unit (ECU). The air conditioner switch 62 is an ON and OFF switch to activate the air-conditioning system and sends information regarding ON/OFF state of the air-conditioning system to the controller 60. The temperature adjuster 63 sends information regarding a target temperature Te(set) to the controller 60. The temperature sensor 64 is located in the vicinity of the evaporator 33 to detect the temperature of the passenger compartment, and sends information regarding the detected temperature Te(t) to the controller 60. The pressure difference detector 36 sends information $\Delta P(t)$ regarding the flow rate of refrigerant in the refrigeration circuit and regarding the compressor displacement to the controller 60.

The ECU is connected to a vehicle speed sensor 65, an engine speed sensor 66 and a throttle sensor 67. The throttle sensor 67 detects the opening size of a throttle valve located in an engine intake passage. The opening size of the throttle valve represents the degree of depression of the gas pedal. The controller 60 receives information regarding the running conditions of the vehicle, that is, the vehicle speed V, the engine speed NE, the gas pedal depression degree Ac(t), through the ECU. The depression degree of the gas pedal may be directly detected. The switch 62, the sensors 63, 64, 65, 66, 67 and the ECU form external information detector M1.

The controller 60 detects the current conditions based on the information from the external information detector M1 and computes the duty ratio Dt of a signal sent from the drive circuit 61 to the coil 54. Then, the controller 60 sends a signal having the computed duty ratio Dt to the drive circuit 61. Accordingly, the control valve 40 continuously adjusts the opening of the supply passage 28 to alter the crank pressure Pc.

Figure 4:
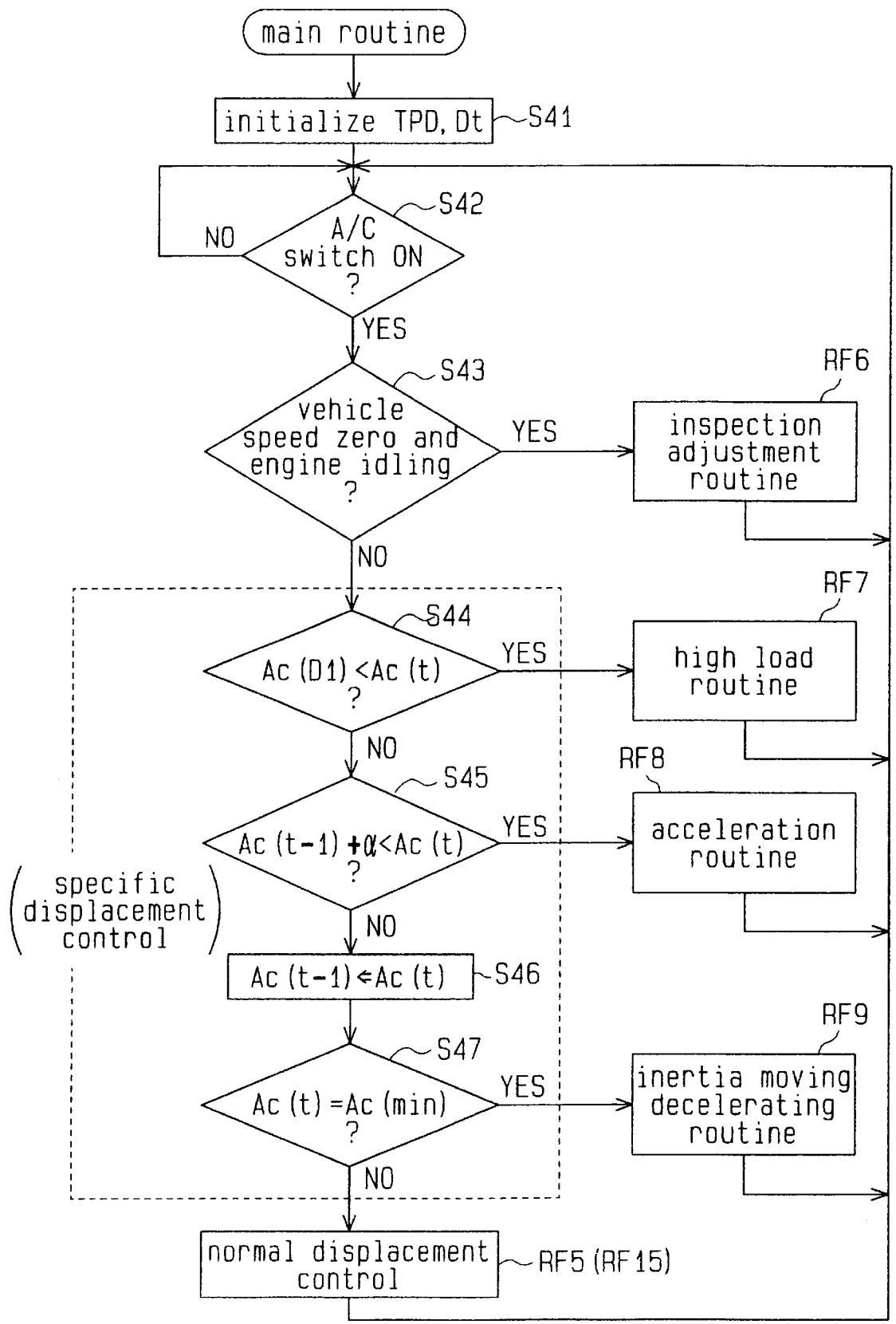
FIG. 4 is a flowchart showing a main routine for controlling a displacement.

A duty control performed by the controller 60 will now be described with reference to flowcharts of FIGS. 4 to 9. The controller 60 performs the duty control for controlling the compressor displacement. The flowchart of FIG. 4 illustrates a main routine of a program for controlling the air-conditioning system. The flowcharts of FIGS. 5 to 9 illustrate sub-routines that are executed when certain conditions are satisfied.

When an ignition switch or a start switch of the vehicle is turned on, current is supplied to the ECU and the controller 60, which causes the ECU and the controller 60 to start computation. In step S41 of FIG. 4, the controller 60 executes initial settings according to an initial program. For example, the controller 60 determines provisional values for a target pressure difference TPD and the duty ratio Dt. The target pressure difference TPD is a target value in a feedback control of the pressure difference (PsH-PsL). After executing step S41, the controller 60 moves to step S42.

In step S42, the controller 60 judges the ON/OFF state of the air conditioner switch 62. If the switch 62 is on, the controller 60 moves to step S43 and judges whether the vehicle is stopped (not moving) and the engine E is idling. Specifically, the controller 60 judges whether the vehicle speed is zero and the engine speed NE is not zero. If the decision outcome of step S43 is negative, the controller 60 moves to a specific condition judgement routine (S44 to S47). If the decision outcome of step S43 is positive, the controller 60 moves a second routine RF6 as an inspection adjustment. When the transmission and clutch do not transmit power from the engine to the wheels even if the vehicle speed is greater than zero, the decision outcome of step S43 is positive.

In a first judgment step (S44), the controller 60 judges whether the current gas pedal depression degree Ac(t) is more than a first determination value Ac(D1). Specifically, the controller 60 judges whether the current depression degree Ac(t) is greater than a value that corresponds to a constant vehicle speed when the vehicle is moving on a flat road surface. In other words, the controller 60 judges whether the engine load is great due to, for example, an uphill movement of the vehicle. The first determination value Ac(D1) is set to, for example, eighty to ninety percent of the maximum depression degree. If the decision outcome of step S44 is positive, that is, if the engine load is great, the controller 60 moves to a third routine RF7 as a high load.

In a second judgment step (S45), the controller 60 judges whether the current pedal depression degree Ac(t) is greater than a value computed by adding an allowable increase amount α to the previous pedal depression degree Ac(t−1). That is, in step S45, the controller 60 judges whether the pedal depression degree Ac(t) has been increased by an amount greater than the allowable amount α. In this manner, the controller 60 detects, for example, whether the vehicle is accelerating for passing another vehicle. Using an appropriate allowable value β permits determination of whether a change of the depression degree Ac(t) is only a fluctuation or an intended depression. If the decision outcome of step S45 is positive, that is, when the vehicle needs to be accelerated, the controller 60 moves to a fourth routine RF8 as an acceleration. If the decision outcome of step S45 is negative, the controller 60 stores the current depression degree Ac(t) as a previous depression degree Ac(t−1) to be used in step S45 in the subsequent cycle.

In a third judgment step (S47), the controller 60 judges whether the current pedal depression degree Ac(t) is less than a minimum depression degree Ac(min). The minimum depression degree Ac(min) is the minimum value of the pedal depression degree. The gas pedal depression degree Ac(t) is defined as being minimum when the driver is not depressing the gas pedal at all. At this time, the engine is prevented from stalling. In step S47, the controller 60 detects, for example, whether the vehicle is moving downhill or whether the vehicle is decelerating. If the decision outcome is positive, that is, if the vehicle is moving by inertia or decelerating, the controller 60 moves to a fifth routine RF9 as moving by inertia or decelerating.

If the decision outcome of step S47 is negative, all the decision outcomes of steps S44, S45 and S47 are negative. In this case, the vehicle is in the normal running state. If the decision outcome of step S47 is negative, the controller 60 moves to a first subroutine RF5. In most cases, the controller 60 returns to step S42 after executing the routine RF5.

Figure 5:
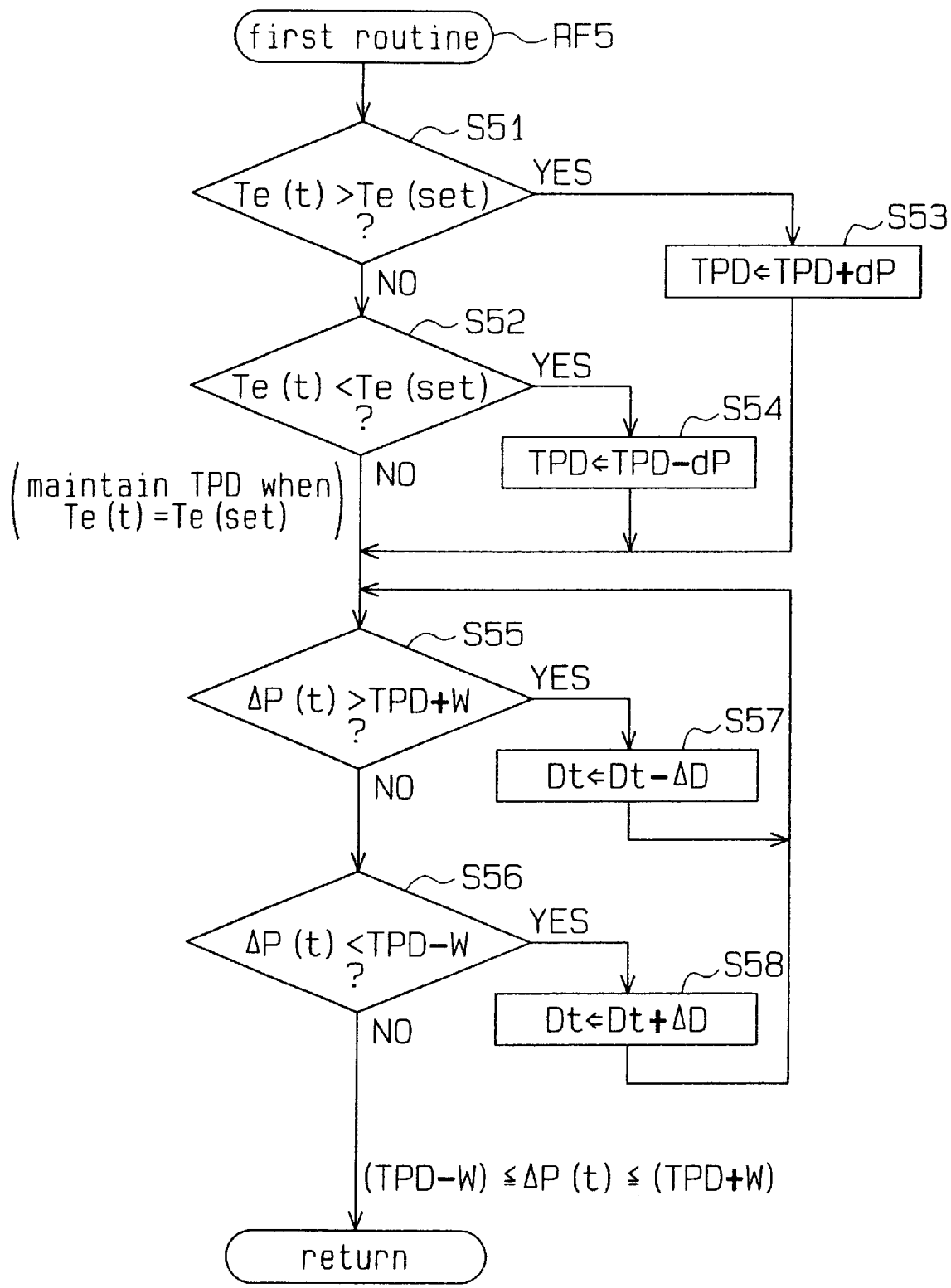
FIG. 5 is a flowchart showing a first subroutine.

FIG. 5 illustrates the first subroutine RF5, which is executed for feedback controlling the compressor displacement. Steps S51 to S54 are executed for reexamining the target pressure difference TPD. In steps S55 to S58, the duty ratio Dt is controlled such that the actual pressure difference ΔP(t), which is detected by the pressure difference detector 36, to seek a target value TPD.

In step S51, the controller 60 judges whether the temperature Te(t) in the vicinity of the evaporator 33, which is detected by the temperature sensor 64, is higher than a target temperature Te(set), which is set by the temperature adjuster 63. If the decision outcome of step S51 is negative, the controller 60 moves to step S52. In step S52, the controller 60 judges whether the temperature Te(t) is lower than the target temperature Te(set). If the decision outcome in step S52 is also negative, the detected temperature Te(t) is equal to the target temperature Te(set). Therefore, a change of the target pressure difference TPD, which alters the cooling performance, need not be performed.

If the decision outcome of step S51 is positive, the thermal load on the evaporator 33 is great. Therefore, the controller 60 increases the target pressure difference TPD by an amount dP in step S53. The increased target pressure difference TPD is referred to as TPD(New), and the previous target pressure difference TPD is referred to as TPD (Old). An increase of the target pressure different TPD increases the cooling performance. If the decision outcome in step S52 is positive, the thermal load on the evaporator 33 is small. In this case, the controller 60 decreases the target pressure difference TPD by the amount dP in step S54, which decreases the cooling performance.

In step S55, the controller 60 judges whether the pressure difference ΔP(t), which is detected by the detector 36, is greater than the sum of the target pressure difference TPD and an allowable margin W. If the decision outcome of S55 is negative, the controller 60 judges whether the pressure difference ΔP(t) is smaller than the difference between the target pressure TPD and the allowable margin W. The precision of the pressure difference control (or hunting amplitude) is adjusted by changing the allowable margin W. If the decision outcomes in steps S55 and S56 are negative, the current pressure difference ΔP(t) is between the values (TPD−W) and (TPD+W). In this case, the controller 60 terminates the routine RF5 without changing the duty ratio Dt.

If the decision outcome of step S55 is positive, the controller 60 decreases the duty ratio Dt by an amount ΔD in step S57 and sends the computed value (Dt−ΔD) to the drive circuit 61. This decreases the electromagnetic force of the solenoid portion 51 and thus increases the opening size of the supply passage 28. As a result, the difference between the crank pressure Pc and the pressure in the cylinder bores 1a is increased, and the inclination angle of the swash plate 12 is decreased. Accordingly, the compressor displacement is decreased and the torque is reduced.

If the decision outcome of step S56 is positive, the controller 60 increases the duty ratio Dt by the amount ΔD in step S58, and sends the value (Dt+ΔD) to the drive circuit 61. This increases the electromagnetic force of the solenoid portion 51 and decreases the opening size of the supply passage 28. As a result, the difference between the crank pressure Pc and the pressure in the cylinder bores 1a is decreased and the inclination angle of the swash plate 12 is increased. As a result, the compressor displacement and the torque are increased. If the detected pressure difference ΔP(t) is greatly different from the target pressure difference TPD, the controller 60 feedback controls the duty ratio in steps S57 and/or S58 to cause the pressure difference ΔP(t) to seek the target pressure difference TPD.

Figure 10:
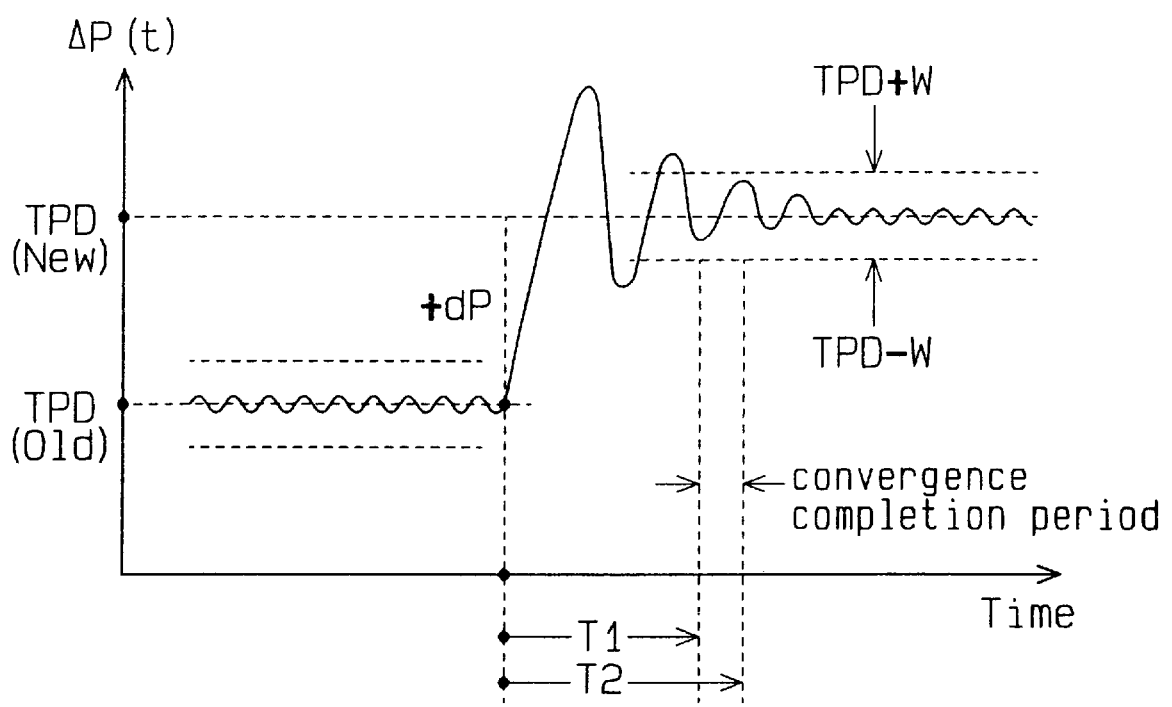
FIG. 10 is a graph showing changes of pressure difference between two points.

The graph of FIG. 10 illustrates changes over time of the pressure difference ΔP(t) from steps S55 to S58 after the target pressure difference TPD is increased in step S53. After the target pressure difference TPD is changed from TPD (Old) to TPD(New), the pressure difference ΔP(t) quickly seeks the new level TPD(New). Specifically, the fluctuation of the pressure difference ΔP(t) subsides within the range between (TPD−W) to (TPD+W) in a time T1 or in a time T2, which are significantly short. This is because the pressure difference ΔP(t) is used as the object of the feedback control. The pressure difference ΔP(t) represents the flow rate of circulating refrigerant. The refrigerant flow rate quickly reflects the opening size of the control valve 40, which is duty controlled. Therefore, the pressure difference ΔP(t) seeks the target pressure difference TPD in a relatively short time. The controller 60 then terminates the first subroutine RF5. If an absolute pressure value, such as the suction pressure Ps, which is influenced by thermal load, is used as a parameter of the feedback control, the pressure difference ΔP(t) will not seek the target value TPD as quickly as shown in FIG. 10.

Figure 6:
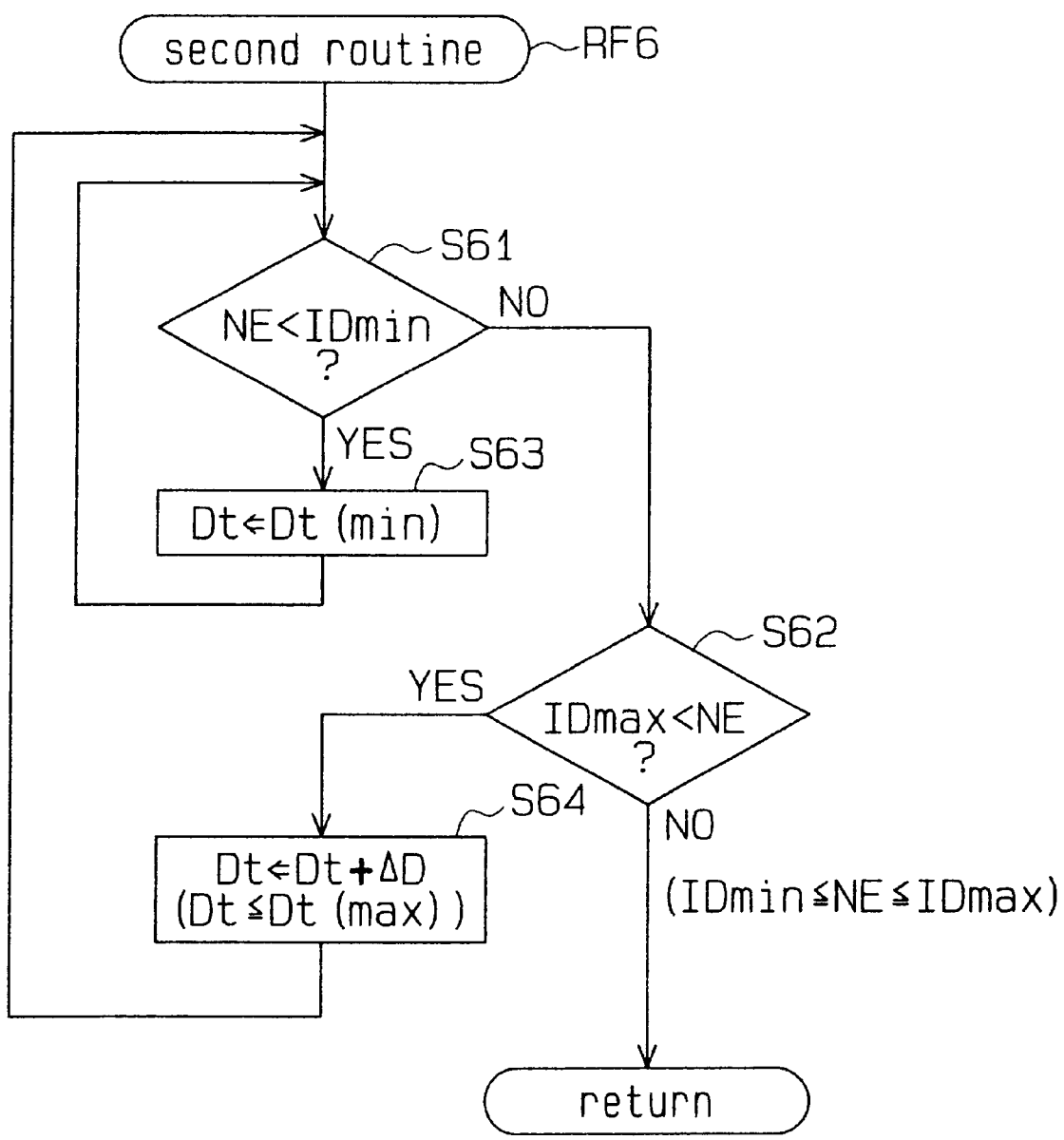
FIG. 6 is a flowchart showing a second subroutine.

If the decision outcome of step S43 of FIG. 43 is positive, the controller 60 executes a second subroutine RF6 shown in FIG. 6. In step S61, the controller 60 judges whether the engine speed NE sent from the ECU is less than a minimum idling speed IDmin. If the decision outcome of step S61 is negative, the controller 60 moves to step S62 and judges whether the engine speed NE is more than a maximum idling speed IDmax. If the decision outcomes of steps S61 and S62 are negative, the engine speed NE is between the minimum idling speed IDmin and the maximum idling speed IDmax. In this case, the controller 60 does not change the duty ratio Dt and moves back to the main routine.

If the decision outcome of step S61 is positive, the idling engine speed NE is abnormally low and the running state of the engine is unstable. Thus, the controller 60 changes the duty ratio Dt to a minimum value Dt(min) in step S63 to minimize the torque of the compressor. This decreases the torque on the engine and thus increases the engine speed NE.

If the decision outcome of step S62 is positive, the engine idling speed NE is abnormally high. In step S64, the controller 60 increases the duty ratio Dt by the amount ΔD to slightly increases the displacement, or the torque, of the compressor. This increases the load on the engine, and thus decreases the engine speed NE. Accordingly, the engine speed NE is stabilized. That is, in the routine RF6, the compressor load torque is adjusted to stabilize the idling engine speed NE. The value of the duty ratio Dt, which is adjusted in step 64, does not exceed the maximum duty ratio Dt(max).

Figure 7:
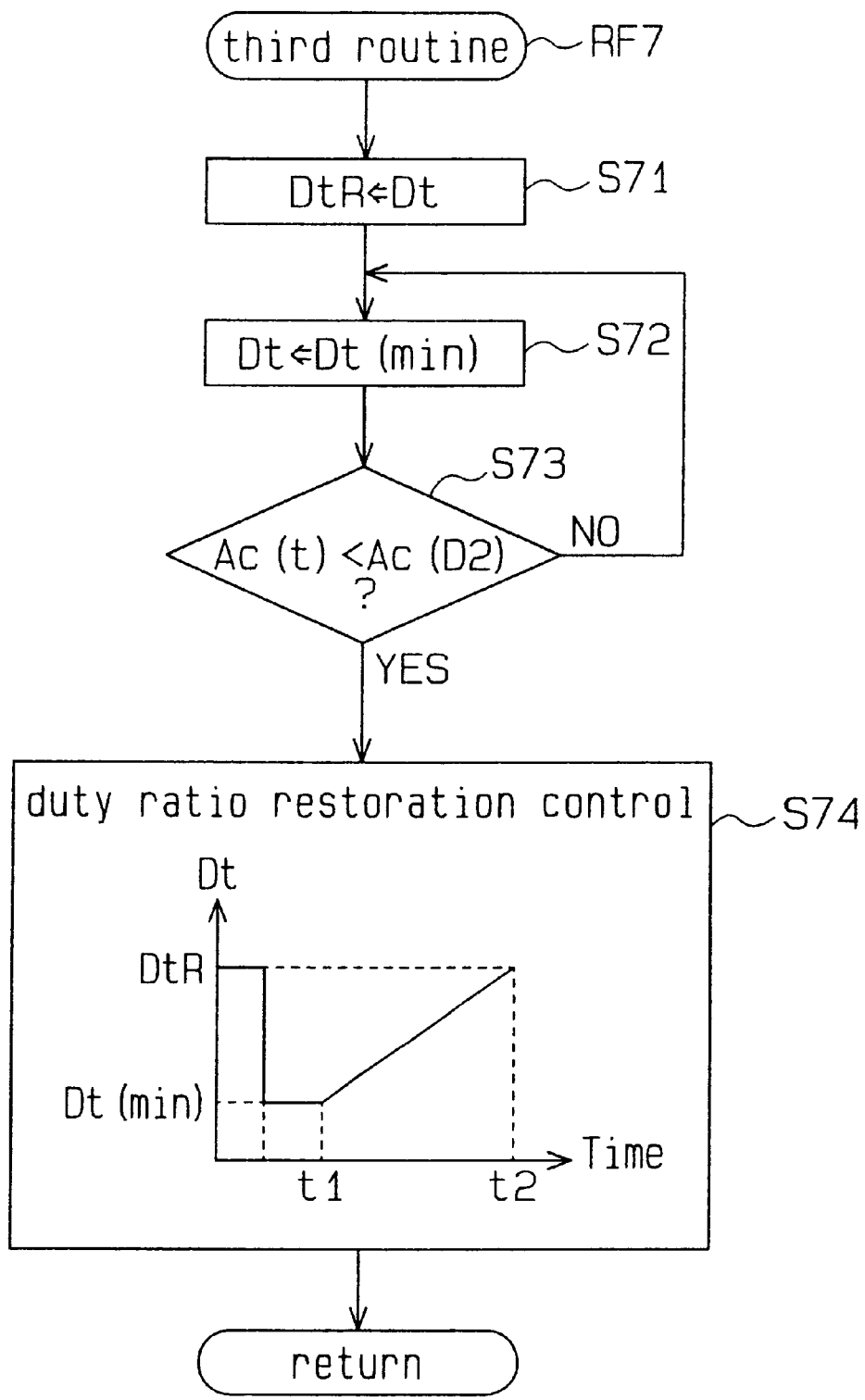
FIG. 7 is a flowchart showing a third subroutine.

If the decision outcome of step S44 of FIG. 4 is positive, the controller 60 executes a third subroutine RF7 shown in FIG. 7. In step S71, the controller 60 stores the current duty ratio Dt as a restoration target value DtR. The restoration target value DtR is used in a duty ratio restoration control procedure of step S74. In step S72, the controller 60 changes the duty ratio Dt to the minimum value Dt(min) and commands the drive circuit 61 to perform duty control using the minimum value Dt(min). In step S73, the controller 60 judges whether the current pedal depression degree Ac(t) is smaller than a second determination value Ac(D2), which is smaller than the first determination value Ac(D1). Step S73 is executed for judging whether the depression degree Ac(t) was decreased, that is, whether the engine load is decreased. The two different determination values Ac(D1) and Ac(D2) are used to produce a hysteresis. The hysteresis prevents hunting, which would occur if only one determination value is used. As long as the decision outcome of step S73 is negative, the duty ratio Dt is maintained at the minimum value Dt(min). Accordingly, the opening size of the supply passage 28 is maximized and the crank pressure Pc is increased. Thus, as long as the engine load is great, the compressor displacement and the load are minimized, which reduces the engine load.

In step S74, the controller 60 gradually increases the duty ratio Dt from the minimum value Dt(min) to the restoration target value DtR. The chart of step S74 illustrates the change of the duty ratio Dt. At time t1, the decision outcome of step S73 is positive. During a period (t2–t1), the duty ratio Dt linearly changes until it reaches the restoration target value DtR. If the change of the duty ratio Dt is too rapid, the inclination of the swash plate 12 changes quickly, which produces a shock. Thus, the slope of the line in the graph of step S74 is determined such that the duty ratio Dt is gradually changed. When the duty ratio Dt reaches the restoration target value DtR, the controller 60 terminates the subroutine RF7 and returns to the main routine.

Figure 8:
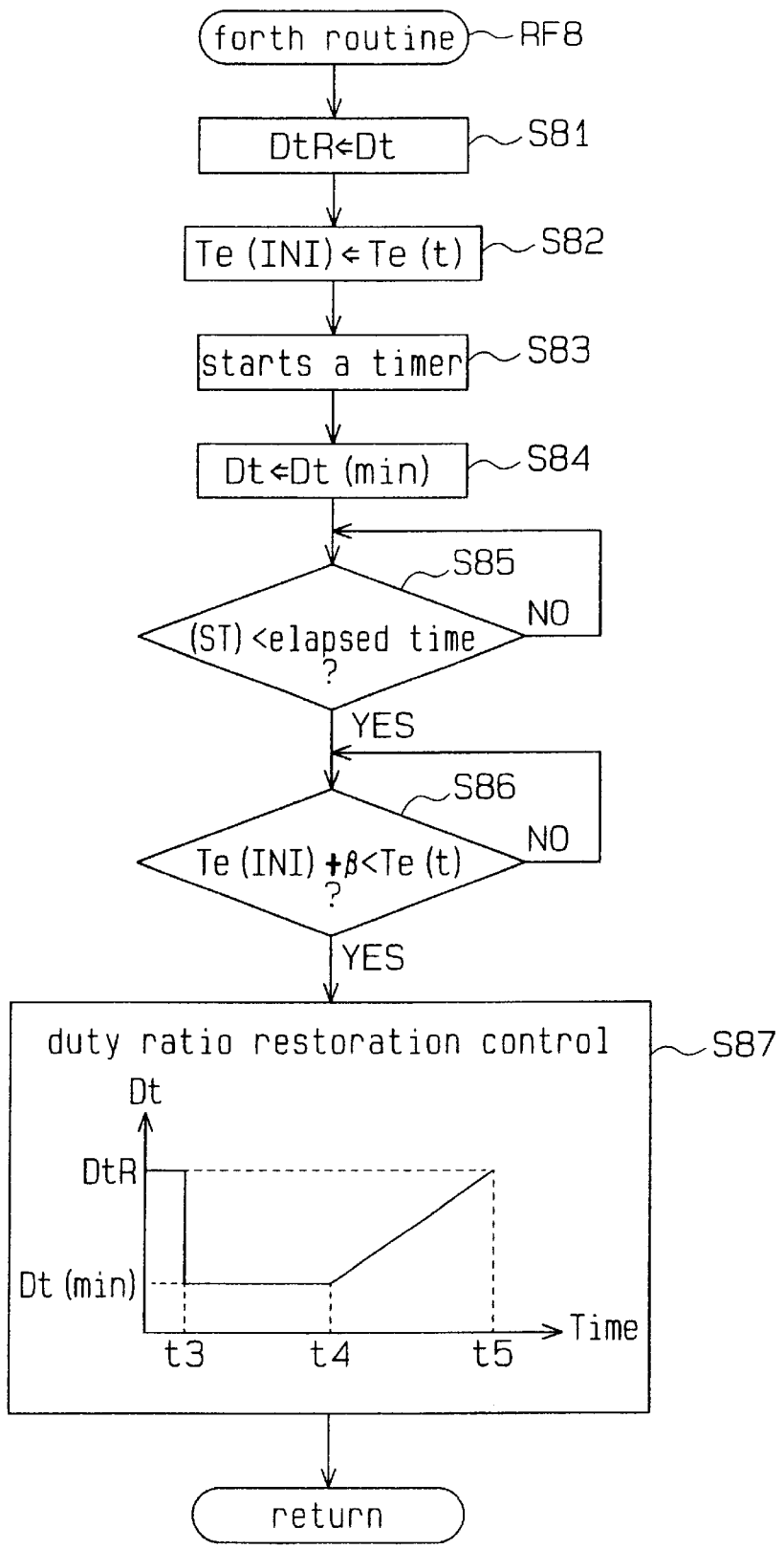
FIG. 8 is a flowchart showing a fourth subroutine.

If the decision outcome of step S45 in FIG. 4 is positive, the controller 60 moves to a fourth subroutine RF8 shown in FIG. 8. In step S81, the controller 60 stores the current duty ratio Dt as a restoration target value DtR. In step 82, the controller 60 stores the current temperature Te(t) as a start temperature Te(INI). In step S83, the controller 60 starts a timer. In step S84, the controller 60 changes the duty ratio Dt to the minimum value Dt(min) and commands the drive circuit 61 to perform duty control using the minimum value Dt(min). Accordingly, the opening size of the control valve 40, or the opening size of the supply passage 28, is maximized, which increases the crank pressure Pc. In step S85, the controller 60 judges whether the elapsed time measured by the timer is more than a predetermined period ST. If the decision outcome of step S85 is negative, the duty ratio Dt is maintained at the minimum value Dt(min). In other words, the supply passage 28 is held fully open at least until the predetermined period ST elapses. Therefore, the compressor displacement and the load torque are minimized. The engine load while the engine is accelerating is reduced in the period ST. Since vehicle accelerations are generally short in duration, the period ST need not be long.

When the period ST elapses, the controller 60 judges whether the current temperature Te(t) is higher than a value computed by adding a value β to the initial temperature Te(INI). That is, the controller 60 judges whether the temperature Te(t) is increased by an amount greater than the value β at least after the period ST. That is, the controller judges whether the cooling performance needs to be immediately restored in step S86.

If the decision outcome of step S86 is positive, the compartment temperature is likely to rise. In this case, the controller 60 restores the duty ratio in step S87. Accordingly, the inclination of the swash plate 12 is not rapidly changed, which prevents a shock. The chart of step S87 illustrates the change of the duty ratio Dt. The time at which the outcome of step S86 is determined to be positive is time t4. The time at which the duty ratio Dt is restored to the restoration target value DtR is time t5. During a period (t5–t4), the duty ratio Dt linearly changes until it reaches the restoration target value DtR. The period (t4–t3) corresponds to the sum of the period ST and a period during which the negative decision is repeated in step S86. When the duty ratio Dt reaches the target value DtR, the controller 60 terminates the fourth subroutine RF8 and returns to the main routine.

Figure 9:
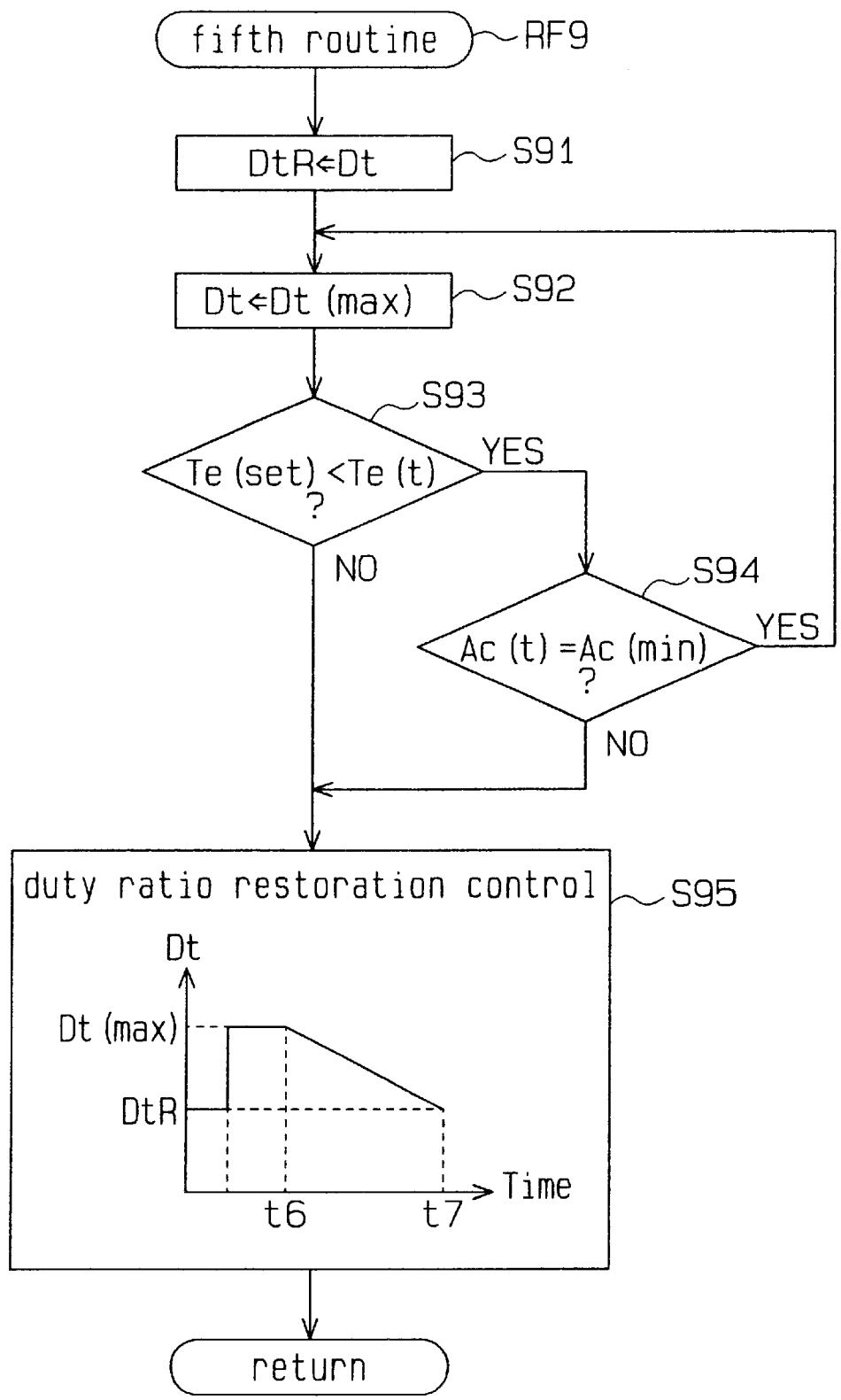
FIG. 9 is a flowchart showing a fifth subroutine.

If the decision outcome of step S47 of FIG. 4 is positive, the controller 60 executes a fifth subroutine RF9 shown in FIG. 9. In step S91, the controller 60 stores the current duty ratio Dt as a restoration target value DtR. In step S92, the controller 60 changes the duty ratio Dt to a maximum value Dt(max) and commands the drive circuit 61 to perform duty control using the maximum value Dt(max). In step S93, the controller 60 judges whether the current temperature Te(t) in the vicinity of the evaporator 33 is higher than the target temperature Te(set). If the decision outcome of step S93 is positive, the controller 60 judges whether the current pedal depression degree Ac(t) is the minimum value Ac(min). If the decision outcomes of steps S93 and S94 are both positive, the controller 60 maintains the duty ratio Dt at the maximum value Dt(max), which closes the supply passage 28 and decreases the crank pressure Pc. Accordingly, the compressor displacement and the torque are maximized. The kinetic energy of the vehicle when the vehicle is moving by inertia or decelerating is used for driving the compressor. The cycle of steps S93, S94 and S92 is an energy recovery procedure similar to the regenerative braking of an electric vehicle. In the fifth subroutine RF9, excessive kinetic energy of the vehicle when the torque on the engine E is not great is used to drive the air-conditioning system to cool the passenger compartment. The main routine RF5 corresponds to the normal displacement control. The third routine RF7 to fifth routine RF9 corresponds to the specific displacement control.

If the decision outcome of step S93 is negative, that is, if the detected temperature Te(t) is lower than the target temperature Te(set), refrigeration is not needed. If the decision outcome of step S94 is negative, that is, when the gas pedal depression degree Ac(t) is great, the vehicle is neither decelerating nor moving by inertia. In this case, the duty ratio Dt is restored in step S95 in a manner that reduces shock, as in the flowcharts in FIGS. 7 and 8. The chart of step S95 illustrates the change of the duty ratio Dt. The time at which the decision outcome of step S93 or S94 is determined to be negative is time t6. The time at which the duty ratio Dt reaches the target DtR is defined as time t7. After a period (t7–t6) elapses, the duty ratio Dt is changed from the maximum value Dt(max) to the restoration target value DtR. When the duty ratio Dt reaches the target value DtR, the controller 60 terminates the fifth subroutine RF9 and returns to the main routine.

This embodiment has the following advantages.

The pressure monitoring points P1, P2 are located in the refrigeration circuit, and the pressure difference ΔP(t) between the pressure at the points P1 and P2 is controlled for feedback controlling the compressor displacement. Therefore, regardless of the thermal load on the evaporator, the displacement is quickly decreased or increased based on a supply of electric current. Thus, when the vehicle is accelerating, the response of the vehicle is improved without destabilizing the vehicle.

The displacement is feedback controlled in accordance with the pressure difference ΔP(t). In the feedback control, the target pressure difference TPD is automatically adjusted based on the detected temperature Te(t) and the target temperature Te(set) in steps S51 to S54 shown in FIG. 5. Thus, the compressor displacement is not only controlled for maintaining the temperature of the passenger compartment under normal conditions, but is quickly changed under specific conditions.

The feedback control using the pressure difference ΔP(t) permits the duty ratio to be restored by a desired pattern (a linear path in this embodiment) in steps S74, S87 and S95. That is, the displacement is linearly and gradually increased from the minimum value.

Figure 27:
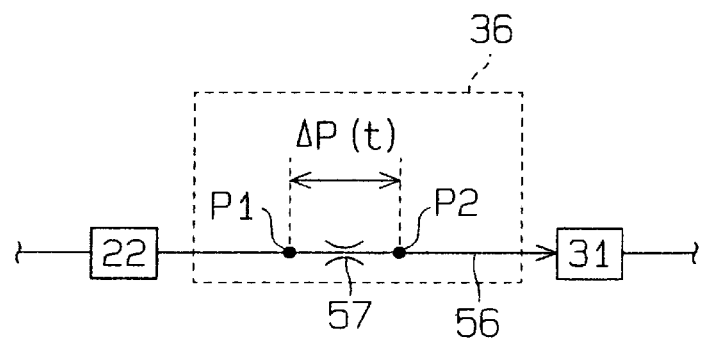
FIG. 27 is a schematic diagram illustrating a refrigeration circuit according to a second embodiment.

FIG. 27 illustrates a second embodiment. In the second embodiment, two pressure monitoring points P1, P2 are located in a pipe 56, which connects the discharge chamber 22 with the condenser 31. A pressure difference detector 36 is located along the pipe 56 to detect the pressure difference ΔP(t). In this case, the flow rate of refrigerant is controlled based on the pressure difference ΔP(t). Feedback control as shown in FIG. 27 can be performed.

As shown in FIG. 27, a resistor 57 such as a throttle may be located between the points P1 and P2. The resistor 57 increases the pressure difference between the points P1 and P2. Therefore, the flow rate of the refrigerant is more easily detected.

A third embodiment will now be described with reference to FIGS. 11 to 15. This embodiment relates to a displacement control mechanism that uses a displacement control valve CV2. The control valve CV2 mechanically the pressure difference ΔP(t) between two points in a refrigeration circuit. Like or the same reference numerals are given to those components that are like or the same as the corresponding components of the first embodiment.

Figure 11:
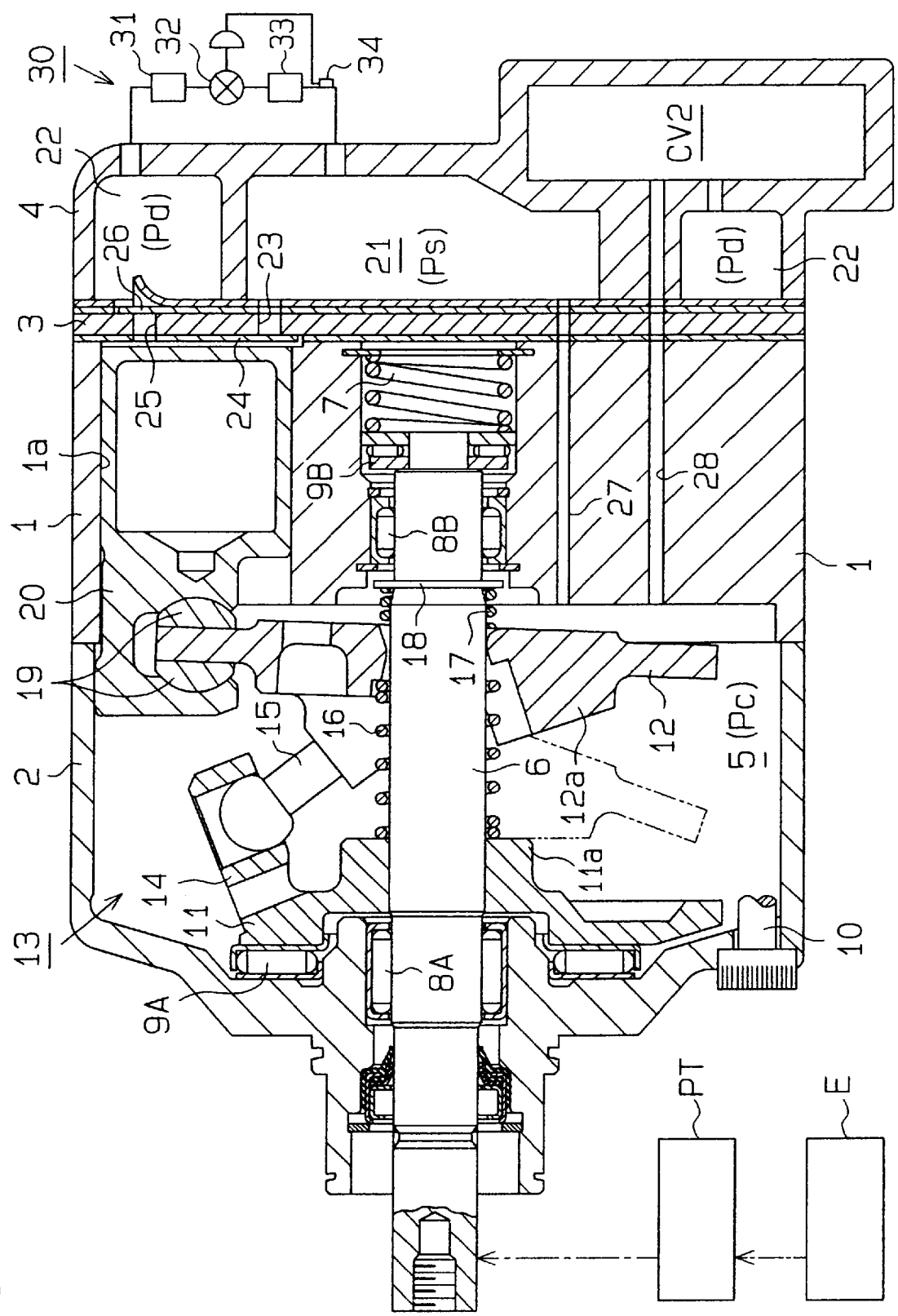
FIG. 11 is a cross-sectional view illustrating a swash plate type variable displacement compressor according to a third embodiment.
Figure 12:
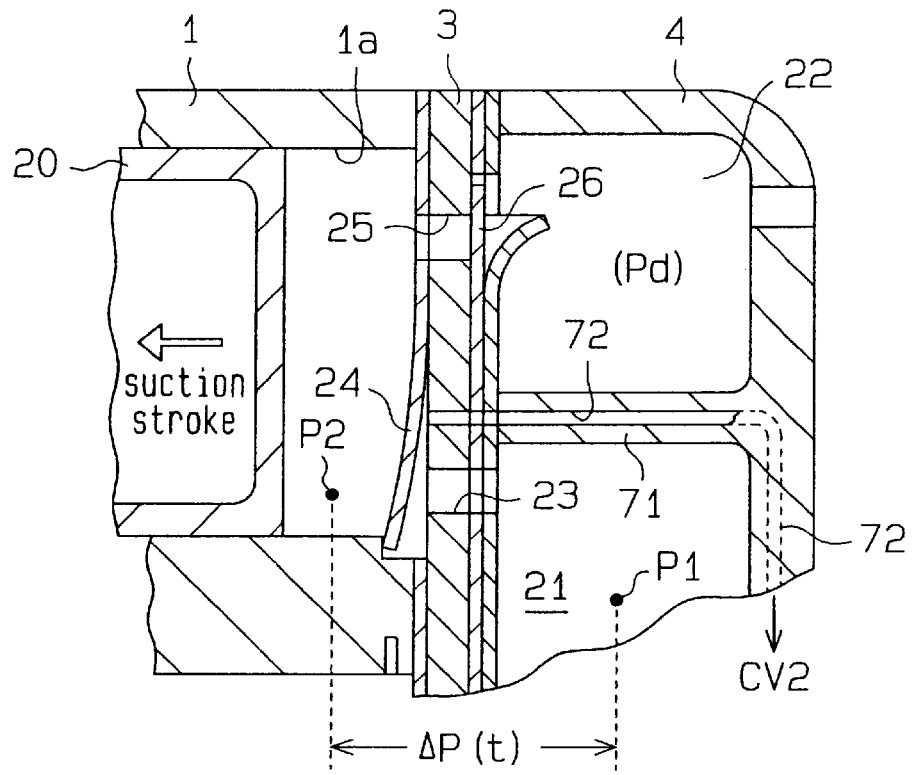
FIG. 12 is an enlarged partial cross-sectional view of the compressor shown in FIG. 11 illustrating a pressure introduction passage.

A compressor shown in FIG. 11 has a displacement control valve CV2, which is different from the control valve 40 of the compressor shown in FIG. 1. As shown in FIG. 12, pressure introduction passages 72 are formed in the housing. The passages 72 are independent from the bleeding passage 27 and the supply passage 28.

Figure 13:
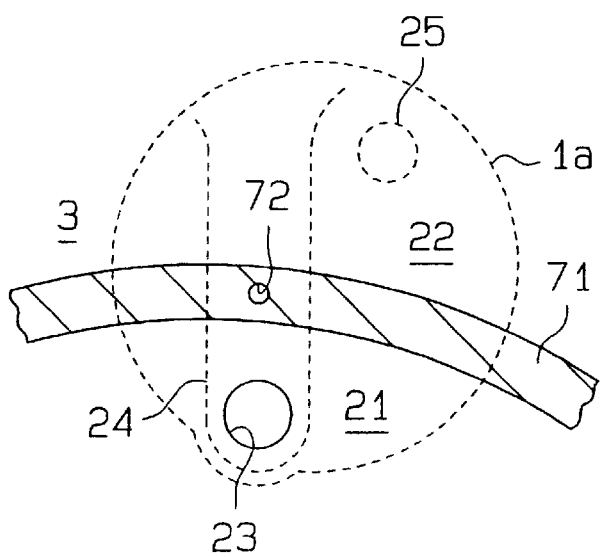
FIG. 13 is a cross-sectional view taken along line 13—13 of FIG. 12.

As shown in FIG. 13, a substantially annular wall 71 is formed in the rear housing member 4 to separate the suction chamber 21 from the discharge chamber 22. Pressure introduction passages 72 (only one is shown) are formed in the wall 71 and the valve plate 3. Each passage 72 corresponds to one of the cylinder bores 1a. One end of each passage 72 is connected to the control valve CV2, and the other end opens to the cylinder bore 1a.

When each piston (20) 20 is moving from the top dead center position to the bottom dead center position, the corresponding pressure introduction passage 72 communicates with the cylinder bore 1a as the cylinder bore 1a is connected to the suction chamber 21 by the suction port 23. When the piston (20) 20 is moving from the bottom dead center position to the top dead center position, the suction valve flap 24 shuts the pressure introduction passage 72. That is, the pressure introduction passage 72 selectively connects and disconnects the cylinder bore 1a with the control valve CV2. At least one of the piston (20)s 20 is always moving from the top dead center position to the bottom dead center position in the associated cylinder bore 1a. Thus, at least one of the cylinder bores 1a always communicates with the corresponding pressure introduction passage 72.

Figure 14:
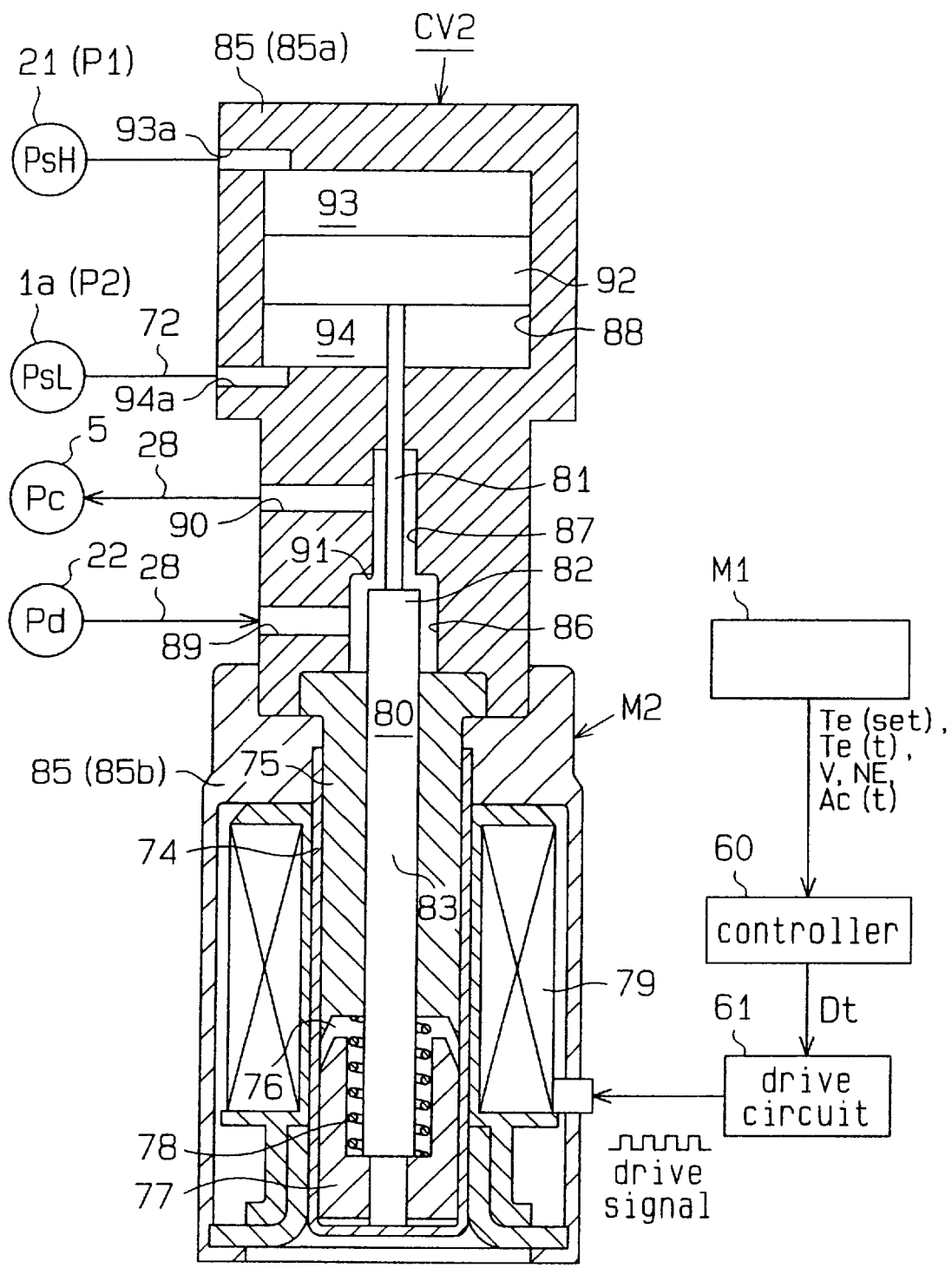
FIG. 14 is a cross-sectional view of a control valve used in the compressor shown in FIG. 11.

FIG. 14 illustrates the displacement control valve CV2 used in the compressor of FIG. 11.

The control valve CV2 includes an inlet valve portion and a solenoid portion. The inlet valve portion adjusts the opening size of the supply passage 28, which connects the discharge chamber 22 with the crank chamber 5. The solenoid portion functions as an electromagnetic actuator M2, which controls a rod 80 located in the control valve CV2 based on a supply of electric current. The rod 80 has a distal small diameter portion 81, a middle valve portion 82 and a proximal large diameter portion 83.

A valve housing 85 has an upper member 85a and a lower member 85b. The upper member 85a forms the inlet valve portion, and the lower member 85b forms the solenoid portion.

A valve chamber 86, a communication passage 87 and a pressure sensing chamber 88 are defined in the upper member 85a. The rod 80 extends and moves axially in the valve chamber 86, the communication passage 87 and the pressure sensing chamber 88. The communication passage 87 communicates with the valve chamber 86. The rod 80 selectively disconnects the passage 87 from the chamber 86. The communication passage 87 is separated from the pressure sensing chamber 88 by a wall, which is a part of the valve housing.

The bottom of the valve chamber 86 is formed by the upper surface of a fixed iron core 75. A Pd port 89 extends radially from the valve chamber 86. The valve chamber 86 is connected to the discharge chamber 22 through the Pd port 89 and the upstream portion of the supply passage 28. A Pc port 90 radially extends from the communication passage 87. The communication passage 87 is connected to the crank chamber 5 through the downstream portion of the supply passage 28 and the Pc port 90. Therefore, the Pd port 89, the valve chamber 86, the communication passage 87 and the Pc port 90, which are formed in the control valve CV2, form a part of the supply passage 28, which connects the discharge chamber 22 with the crank chamber 5.

The valve body 82 of the rod 80 is located in the valve chamber 86. The diameter of the communication passage 87 is larger than the diameter of the small diameter portion 81 and is smaller than the diameter of the large diameter portion 83. A valve seat 91 is formed on the opening of the communication passage 87, which functions as a valve hole. If the rod 80 is moved from the position shown in FIG. 14, or the lowest position, to a highest position, where the valve body 82 contacts the valve seat 91, the communication passage 87 is closed. That is, the valve body 82 of the rod 80 functions as an inlet valve body, which controls the opening size of the supply passage 28.

The distal end of the small diameter portion 81 is located in the pressure sensing chamber 88. A dividing member, which is a movable wall 92, is fixed to the distal end. The movable wall 92 axially divides the pressure sensing chamber 88 into a P1 pressure chamber 93 and a P2 pressure chamber 94. The movable wall 92 moves axially in the pressure sensing chamber 88. The movable wall 92 does not permit fluid to move between the P1 pressure chamber 93 and the P2 pressure chamber 94.

The P1 pressure chamber 93 is always connected to the suction chamber 21 through a P1 port 93a, which is formed in the valve housing. On the other hand, the P2 pressure chamber 94 is always connected to at least one of the cylinder bores 1a through a P2 port 94a and the pressure introduction passages 72. The interior of the P1 pressure chamber 93 is exposed to the pressure Ps in the suction chamber 21. The pressure Ps in the P1 pressure chamber 93 is the pressure PsH. The interior of the P2 pressure chamber 94 is exposed to the pressure in the cylinder bore 1a in which the piston (20) 20 is moving from the top dead center position to the bottom dead center position. The pressure in the P2 pressure chamber 94 is the pressure PsL. The upper and lower surfaces of the movable wall 92 receive the suction pressure PsH and the pressure PsL from the cylinder bores 1a. Since the upper surface and the lower surface have substantially the same area S, the movable wall 92 applies a downward force F1 to the rod 80, and the magnitude of the force F1 is represented by an equation F1=(PsH−PsL)*S. The pressure sensing chamber 88, the movable wall 92, the P1 pressure chamber 93 and the P2 pressure chamber 94 form a mechanical pressure difference detector.

The solenoid portion includes a cup-shaped cylinder 74. The cylinder 74 is fitted into the fixed iron core 75. A solenoid chamber 76 is defined in the cylinder 74. A plunger, which is a movable iron core 77, is accommodated in the solenoid 76. The iron core 77 moves axially. The large diameter portion 83 of the rod 80 is located in the fixed core 75 to move axially. The lower end of the large diameter portion 83 is located in the solenoid chamber 76 and is fitted into a hole formed in the center of the movable core 77. The movable iron core 77 is crimped to the large diameter portion 83. Thus, the movable core 77 moves integrally with the rod 80.

A spring 78 is located between the fixed core 75 and the movable core 77. The spring 78 urges the movable core 77 and the rod 80 such that the movable core 77 moves away from fixed core 75. The spring 78 returns the movable core 77 and the rod 80 to the lowest position, or the initial position. a coil 79 is wound about the fixed core 75 and the movable core 77. The coil 79 receives drive signals from the drive circuit 61. The drive signal has a predetermined duty ratio Dt based on a command from the controller 60. The coil 79 generates an electromagnetic force F2, the magnitude of which corresponds to the duty ratio Dt, or to the value of the electric current. The electromagnetic force F2 moves the movable core 77 toward the fixed core 75, which moves the rod 80 upward.

When no current is supplied to the coil 79 (Dt=0%), the spring 78 moves the rod 80 to the lowest position, which is shown in FIG. 14. In this state, the valve body 82 of the rod 80 separates from the valve seat 91, which fully opens the inlet valve portion.

When the minimum current in a range of the duty ratio Dt is supplied to the coil 79, the upward force F2 is greater than the downward force f2 of the spring 78. Therefore, a force (F2−f2) acts against the force F1. When current is supplied to the coil 79, the position of the valve body 82 relative to the valve seat 91 is determined by the equilibrium of the force (F2−f2) and the force F1. The opening size of the control valve CV2 is determined accordingly. The flow rate of gas to the crank chamber 5 through the supply passage 28 is determined in accordance with the opening size of the control valve CV2. The flow rate of gas from the crank chamber 5 through the bleeding passage 27 and into the crank chamber 5 adjusts the crank pressure Pc.

The electromagnetic force F2 electrically controls the target value of the force F1. The force F1 represents the difference ΔP(t) of the suction pressure PsH and the pressure PsL in the cylinder bores 1a. The electromagnetic force F2 is adjusted by changing the current to the coil 79 and defines a desired target pressure difference TPD. Therefore, the solenoid portion, the drive circuit 61 and the controller 60 function as altering means for externally changing the target value of the pressure difference. Thus, the control valve CV2 shown in FIG. 14 is an inlet control valve that changes the target pressure difference TPD based on the value of current supplied to the coil 79.

The detector M1 of FIG. 14 includes the sensors 62, 63, 64, 65, 66, 67 and the ECU. The external information that the external information detector M1 sends to the controller 60 is the same as that in the embodiment of FIGS. 1 to 10. In this embodiment, the controller 60 and the displacement control valve CV2 form a displacement control means. In the second embodiment, the controller 60 operates substantially based on the main routine shown in FIG. 4.

Figure 15:
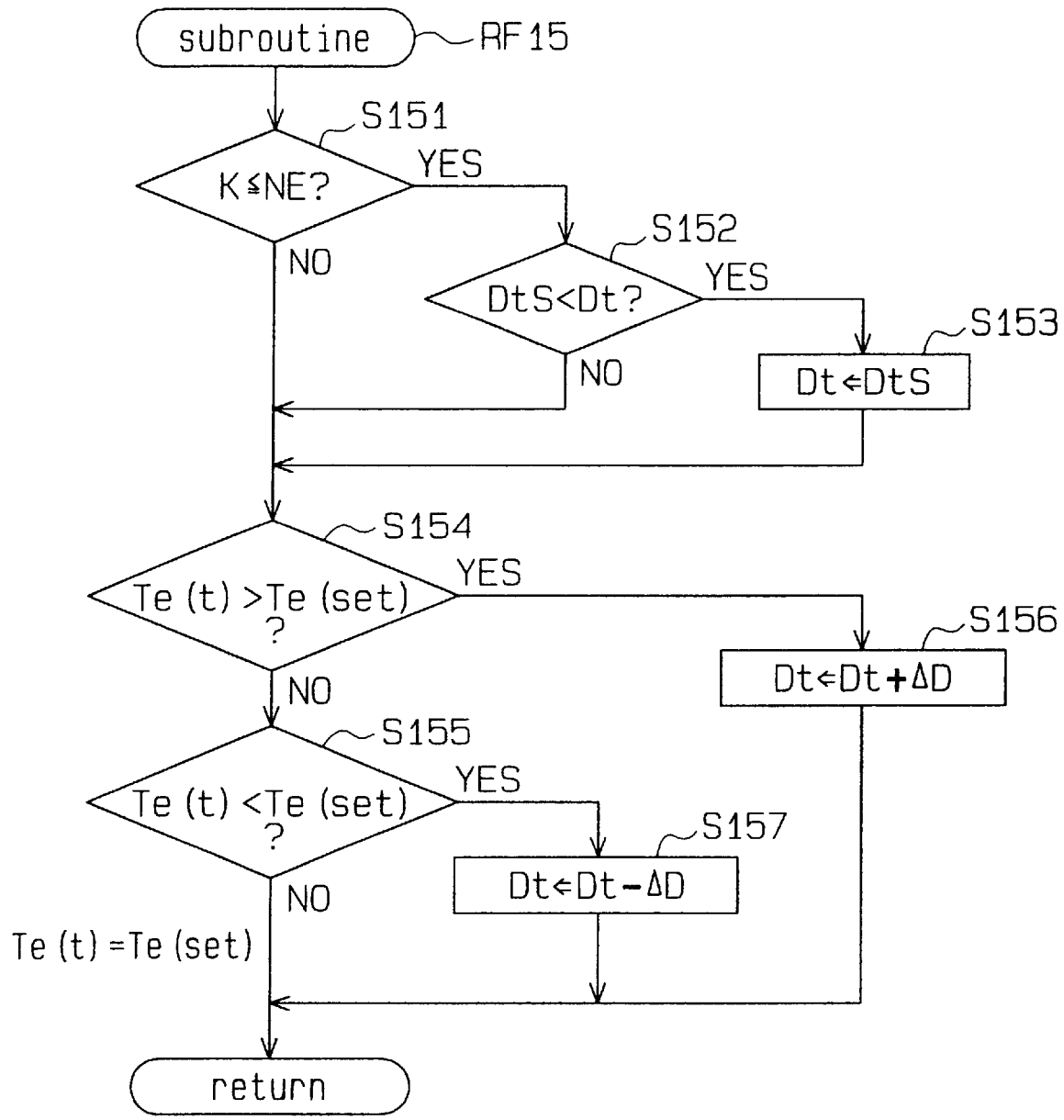
FIG. 15 is a flowchart showing routine for determining a target pressure difference according to the third embodiment.

A subroutine RF15 shown in FIG. 15 represents a feedback control procedure of the compressor displacement when the compressor is running in a normal displacement control mode. The control valve CV2 uses the movable wall 92 to detect a pressure difference. The control valve CV2 mechanically and automatically feedback controls the valve opening size in relation to the pressure difference ΔP(t) (ΔP(t)=PsH−PsL). In the routine RF15, the target pressure difference TPD is corrected in accordance with the thermal load on the evaporator 33. Steps S151 to S153 of FIG. 15 are related to a danger avoidance control for preventing seizure in the compressor when the engine speed is high. Steps S154 to S157 represent a control for changing the target pressure difference TPD by adjusting the duty ratio Dt.

In S151, the controller 60 determines whether the engine speed NE is equal to or greater than a predetermined value K. The value K is a threshold to judge the likelihood of compressor malfunction and is set, for example, to 5000 rpm or 6000 rpm. If the engine speed NE is maintained above the value K, malfunction is likely to occur. If the decision outcome of step S151 is positive, the controller 60 judges whether the duty ratio Dt is greater than a predetermined safety value DtS. The safety value DtS is an upper threshold value of the duty ratio Dt. If the duty ratio Dt is greater than the safety value DtS in step S152, the target pressure difference TPD and the compressor displacement will be excessively great. Specifically, the safety value DtS is, for example, 40% or 50%. If the decision outcomes of steps S151 and S152 are positive, the duty ratio Dt is a value that forces the compressor to operate at an excessive displacement. In this case, the controller 60 commands the drive circuit 61 to lower the duty ratio Dt to the safety value DtS in step S153. In this manner, when the engine speed NE is higher than the threshold value K, the compressor is prevented from operating at an excessive displacement. If the outcome of the steps S151 or S152 is negative, or after the duty ratio Dt is adjusted in step S153, the controller 60 moves to step S154.

In step S154, the controller 60 judges whether the temperature Te(t) of the evaporator 33 is greater than the target temperature Te(set). If the outcome of step S154 is negative, the controller 60 moves to step S155 and judges whether the temperature Te(t) is lower than the target temperature Te(set). If the decision outcome of step S155 is negative, the temperature Te(t) is equal to the target temperature Te(set). Thus, the controller 60 does not command the drive circuit 61 to change the duty ratio Dt and suspends the routine RF15.

If the outcome is positive in step S154, the thermal load on the evaporator 33 is great. In this case, the controller 60 moves to step S156 and increases the duty ratio Dt by a unit ΔD. The controller 60 commands the drive circuit 61 to increase the duty ratio Dt to (Dt+ΔD). Accordingly, the electromagnetic force of the solenoid portion F2 is increased, which increases the target pressure difference TPD of the control valve CV2. At this time, the pressure difference ΔP(t) cannot equalize the upward force with the downward force. Therefore, the rod 80 is moved upward to contract the spring 78. The position of the valve body 82 is determined by the equilibrium of the force (F2-f2) and the force F1. That is, the valve body 82 is at a position where the equation (F1=(F2-f2)) is satisfied. As a result, the opening size of the supply passage 28 is decreased and the crank pressure Pc is lowered.

Thus, the difference between the pressure Pc and the pressure in the cylinder bores 1a becomes small, which increases the inclination of the swash plate 12. Accordingly, the displacement and the load of the compressor are increased. The increased compressor displacement lowers the temperature Te(t). Further, the pressure difference between the points P1 and P2 is increased.

If the outcome of step S155 is positive, the thermal load on the evaporator 33 is small. In this case, the controller 60 moves to step S157 and reduces the duty ratio Dt by the amount ΔD. The controller 60 commands the drive circuit 61 to decrease the duty ratio Dt to (Dt−ΔD). This decreases the electromagnetic force F2 of the solenoid portion, which decreases the target pressure difference TPD of the control valve CV2. Then, the rod 80 is moved downward to decreases the downward force f2 of the spring 78. The valve body 82 is moved to a position where the equation F1=(F2−f2) is satisfied. As a result, the opening size of the supply passage 28 is increased and the crank pressure Pc is raised.

The difference between the crank pressure Pc and the pressure in the cylinder bores 1a is relatively great. This decreases the inclination angle of the swash plate 12. Accordingly, the displacement and the load of the compressor are decreased. The decreased compressor displacement lowers the heat reduction performance of the evaporator 33 and raises the temperature Te(t). Further, the pressure difference between the points P1 and P2 is decreased.

In this manner, if the temperature Te(t) is different from the target temperature Te(set), the target pressure difference TPD is optimized, and the control valve CV2 automatically changes its valve opening size to cause the temperature Te(t) to approach the target temperature Te(set). The control valve CV2 functions as an inlet control valve that maintains the pressure difference between the points P1 and P2, or the flow rate of gas.

The third embodiment has the same advantages as the embodiment of FIGS. 1 to 10.

Figure 16:
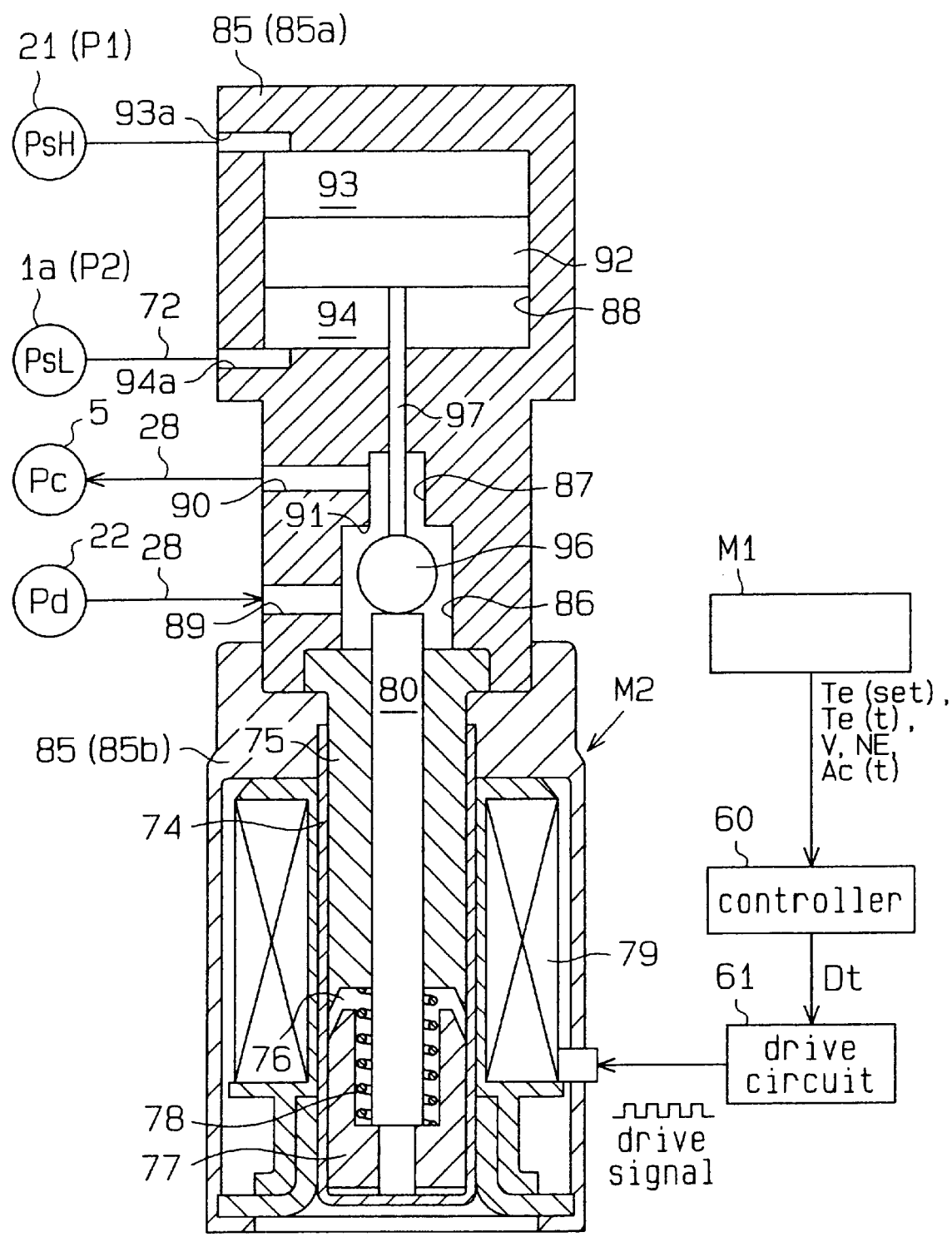
FIG. 16 is a cross-sectional view illustrating a displacement control valve according to a fourth embodiment.

FIG. 16 illustrates a control valve according to a fourth embodiment. The control valve of FIG. 16 is different from the control valve in FIG. 14 in the structure of the rod and the valve body. A spherical valve body 96 is located in the valve chamber 86 to contact the valve seat 91. The valve body 96 is coupled to the movable wall 92 by a small diameter rod 97. The movable wall 92, the rod 97 and the valve body 96 move integrally in the axial direction. The upper end of the rod 80 is located in the fixed iron core 75 to move axially. The upper end of the rod 80 contacts the valve body 96 in the valve chamber 86.

When a current of the minimum duty ratio Dt is supplied to the coil 79, the rod 80 contacts the valve body 96. The valve body 96 is coupled to the movable wall 92 by the rod 97. As in the case of the control valve shown in FIG. 14, the position of the valve body 96 is determined by the equilibrium of the force F1 based on the pressure difference ΔP(t)(ΔP(t)=(PsH−PsL)), the electromagnetic force F2 and the force f2 of the spring 78. The opening size of the supply passage 28 is controlled, accordingly. The control valve of FIG. 16 has the same advantages as the control valve of FIG. 14.

Figure 17:
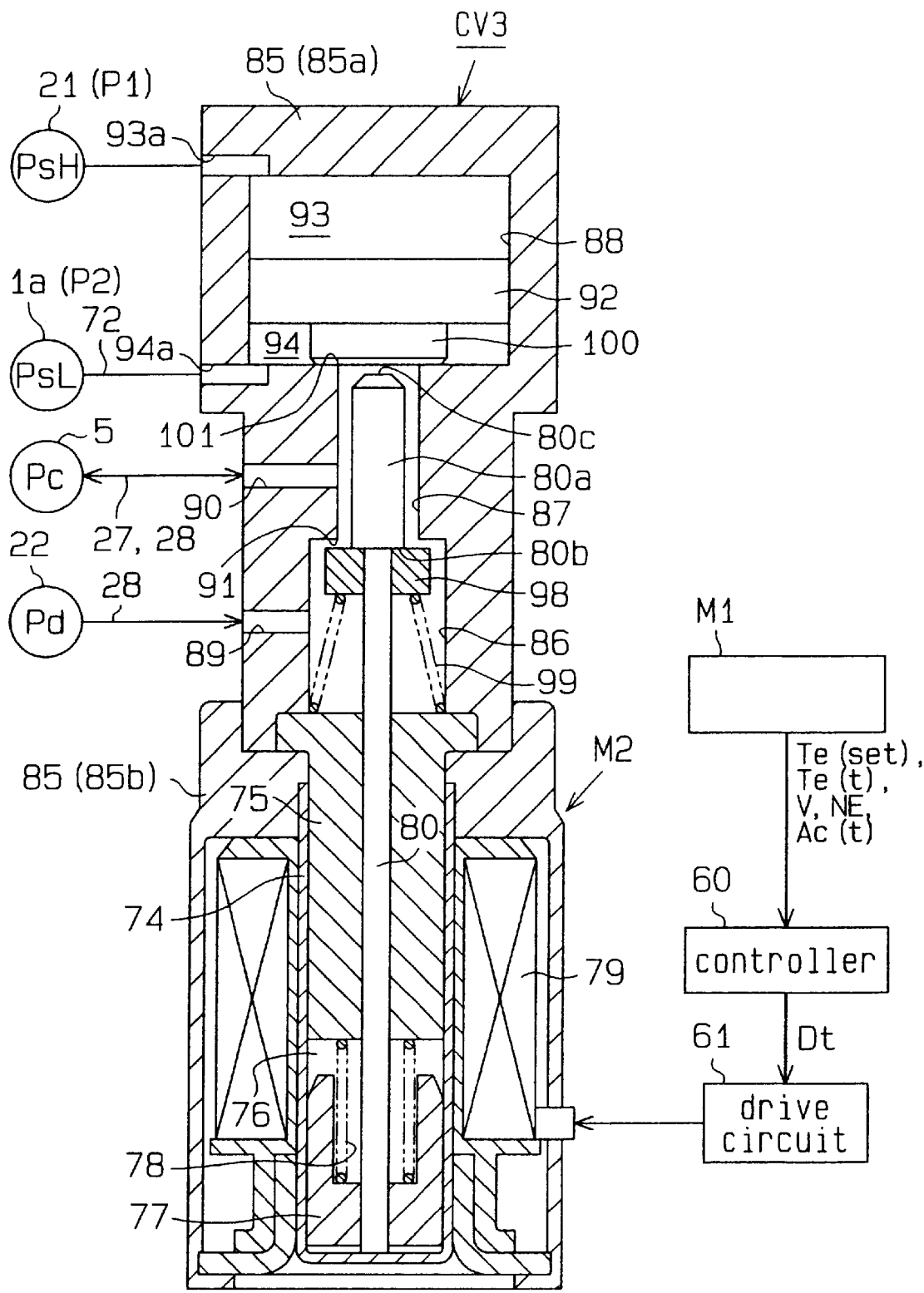
FIG. 17 is a cross-sectional view illustrating a displacement control valve according to a fifth embodiment when a valve hole is open.
Figure 18:
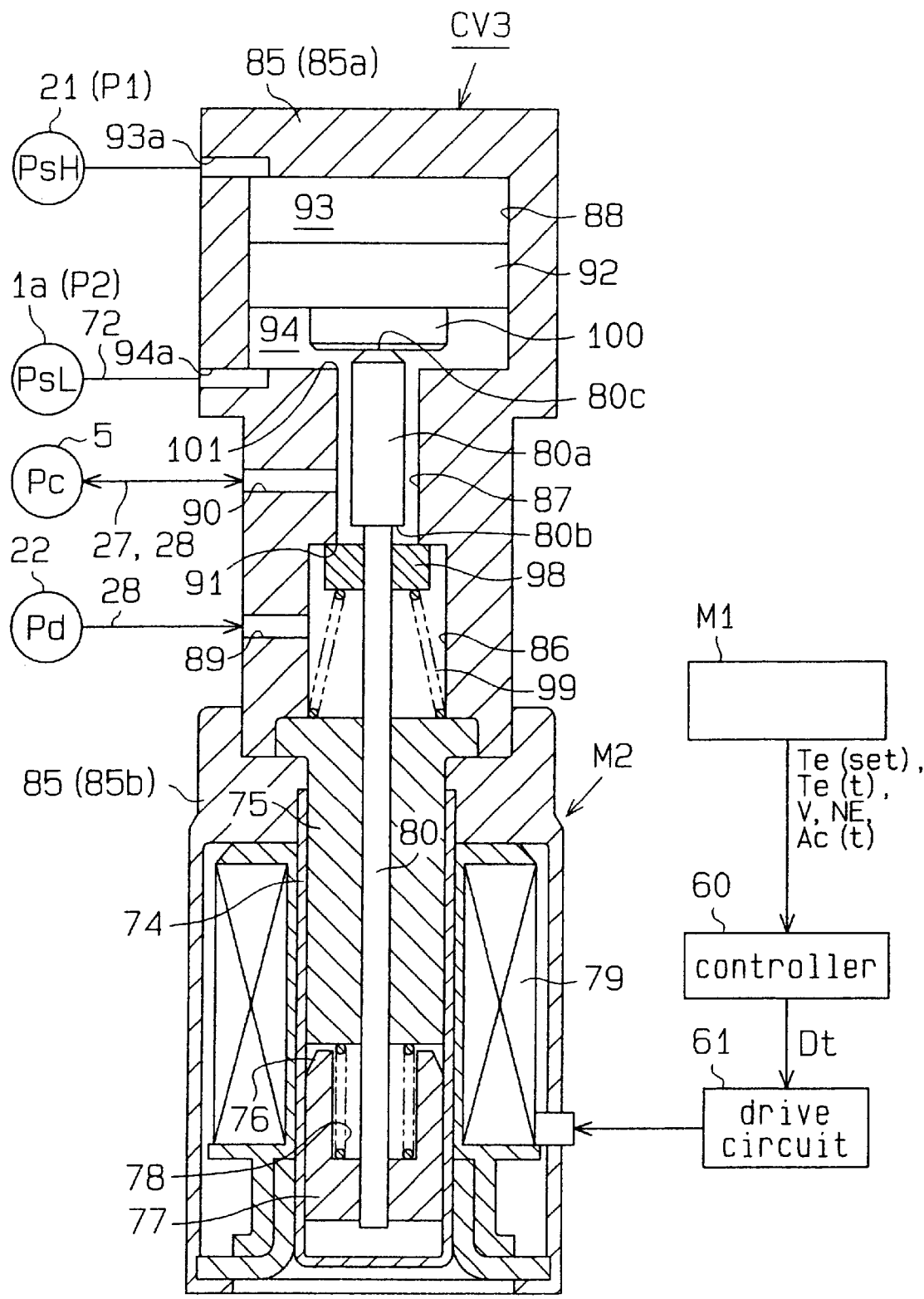
FIG. 18 is a cross-sectional view like FIG. 17 when the valve hole is closed.

FIGS. 17 and 18 illustrate a displacement control valve CV3 according to a fifth embodiment. The control valve CV3 has functions of an inlet control valve and an outlet control valve. The differences from the control valve CV2 shown in FIG. 14 will mainly be discussed below.

When the control valve CV3 functions as an inlet control valve, the bleeding passage 27 constantly functions as an outlet passage for releasing refrigerant gas from the crank chamber, and the control valve CV3 regulates the supply passage 28, or an inlet passage. The control valve CV3 controls the flow rate of gas from the discharge chamber 22 to the crank chamber 5 to set the crank pressure Pc to a desired level.

When the control valve CV3 functions as an outlet control valve, the control valve CV3 is located on the bleeding passage 27, or an outlet passage. When each piston (20) 20 compresses the gas in the associated cylinder bore 1a, refrigerant gas in the cylinder bore 1a leaks into the crank chamber 5 between the surface of the piston (20) 20 and the wall of the cylinder bore 1a. The leaking gas is referred to as blowby gas. The blowby gas increases the pressure of the crank chamber 5. The control valve CV3 adjusts the flow rate of refrigerant gas flowing from the crank chamber 5 to the suction chamber 21 to set the crank pressure Pc to a desired level.

The control valve CV3 has an inlet-outlet valve portion located in its upper half and a solenoid portion located in its lower half.

The bleeding passage 27 of FIG. 11 connects the crank chamber 5 with the suction chamber 21. In the embodiment of FIGS. 17, 18, part of the bleeding passage 27 connects the crank chamber 5 with the control valve CV3. The pressure introduction passages 72 is connected to the bleeding passage 27 in the control valve CV3. The pressure introduction passage 72 forms part of the bleeding passage 27. The inlet-outlet valve portion selectively controls the opening size of the supply passage 28 and the opening size of the bleeding passage 27, 72. The solenoid portion includes an electromagnetic actuator M2, which has the rod 80. The actuator M2 moves the rod 80 in accordance with the value of current supplied to the solenoid. The proximal end of the rod 80 is secured to a movable iron core 77. The other structures of the solenoid portion are substantially the same as those of the solenoid portion of the control valve CV2 shown in FIG. 14.

An engaging portion 80a is formed in the distal portion of the rod 80. The engaging portion 80a is located in a communication passage 87. The diameter of the engaging portion 80a is greater than that of the rest of the rod 80. A first engaging surface 80b is defined between the engaging portion 80a and the rest of the rod 80. A second engaging surface 80c is formed on the upper face of the engaging portion 80a. The inlet valve body 98 and an outlet valve body 100 selectively connect the communication passage 87 with the valve chamber 86 or with the pressure sensing chamber 88.

Like in the control valve CV2 of FIG. 14, the Pd port 89, the valve chamber 86, the communication passage 87 and the Pc port 90 form a part of the supply passage 28.

An annular inlet valve body 98 is located on the valve chamber 86. The inlet valve body 98 is loosely fitted about the rod 80 so that it may slide. The outer diameter of the inlet valve body 98 is smaller than the diameter of the valve chamber 86 and is larger than the diameter of the communication passage 87, which functions as a valve hole. The step between the valve chamber 86 and the passage 87 functions as a valve seat 91. The inlet valve body 98 contacts the valve seat 91. A spring 99 is located between the bottom of the valve chamber 86 and the inlet valve body 98. The spring 99 always urges the valve body 98 upward, or in a direction causing the valve body 98 to contact the valve seat 91. The communication passage 87 is closed by the valve body 98. The upward force f3 of the spring 99 is smaller than the downward force f2 of the spring 78.

The movable wall 92 is located in the pressure sensing chamber 88 to move axially. The movable wall 92 divides the pressure sensing chamber 88 into a P1 pressure chamber 93 and a P2 pressure chamber 94. The movable wall 92 does not permit fluid to move between the P1 pressure chamber 93 and the P2 pressure chamber 94. The P1 pressure chamber 93 is always connected to the suction chamber 21 by a P1 port 93a, which is formed in the valve housing. The P2 pressure chamber is connected to the cylinder bores 1a by the pressure introduction passage 72 and a P2 port 94a, which is formed in the valve housing.

The interior of the P1 pressure chamber 93 is exposed to the pressure Ps in the suction chamber 21. The pressure Ps in the P1 pressure chamber 93 is the pressure PsH. The interior of the P2 pressure chamber 94 is exposed to the pressure in the cylinder bores 1a. The pressure in the P2 pressure chamber 94 is the pressure PsL. The pressure PsL is lower than the pressure PsH. The Pc port 90, the communication passage 87, the P2 pressure chamber 94 and the P2 port 94a connect the bleeding passage 27 to the pressure introduction passage 72. The pressure in each cylinder bore 1a is close to the suction pressure Ps when the associated piston (20) 20 is in the suction stroke. The downstream portion of the supply passage 28 also functions as the upstream portion of the bleeding passage 27. The pressure sensing chamber 88, the movable wall 92, the P1 pressure chamber 93 and the P2 pressure chamber 94 function as a pressure difference detector of the control valve CV3.

The outlet valve body 100 is integrally formed with the movable wall 92 and is located in the P2 pressure chamber 94. The outlet valve body 100 moves closer to an away from the communication hole 87 in accordance with movement of the movable wall 92. The diameter of the outlet valve body 100 is larger than the diameter of the communication passage 87. Thus, the step between the communication passage 87 and the P2 pressure chamber 94 functions as a valve seat 101. As shown in FIG. 17, the outlet valve body 100 contacts the valve seat 101. When the rod 80 moves downward, the movable wall 92 and the outlet valve body 100 move downward together, and the outlet valve body 100 is pressed against the valve seat 101 a force F1, which reflects the pressure difference between the chambers 93, 94 (F1=PsH−PsL). This closes the communication passage 87.

The axial length of the engaging portion 80a is shorter than the axial length of the communication passage 87. Therefore, depending on the magnitude of the electromagnetic force F2 of the solenoid portion, the engaging portion 80a can be separated from both valve bodies 98 and 100. In this state, the valve bodies 98, 100 contact the valve seat 91, 101, respectively. That is, the bleeding passage 27 and the supply passage 28 are closed at the same time. In other words, the control valve CV3 functions either as the inlet control valve or the outlet control valve based on the duty ratio of the solenoid portion.

The operation of the displacement control valve CV3 will now be described.

When no current is supplied to the coil 79 (Dt=0%), the spring 78 moves the rod 80 to the lowest position, which is shown in FIG. 17. In this state, the first engaging surface 80b contacts the inlet valve body 98 against the force of the spring 99. As a result, the inlet valve body 98 separates from the valve seat 91 and the opening size of the supply passage 28 is maximized. On the other hand, the movable wall 92 and the outlet valve body 100 are located in the lowest position in the pressure sensing chamber 88, which causes the outlet valve body 100 to close the communication passage 87. At this time, the control valve CV3 functions as an inlet control valve.

When the minimum current in a range of the duty ratio Dt is supplied to the coil 79, the upward force F2 is greater than the downward force f2 of the spring 78. The rod 80 is moved upward until the second engaging surface 80c contacts the bottom of the outlet valve body 100. As the rod 80 is moved upward, the first engaging surface 80b separates from the inlet valve body 98. Therefore, the inlet valve body 98 is pressed against the valve seat 91 by the force of the spring 99. As a result, the supply passage 28 is closed by the inlet valve body 98.

When the upward electromagnetic force F2 is great, the engaging portion 80a urges the valve body 100 upward to connect the pressure introduction passage 72 with the bleeding passage 27. At this time, the control valve CV3 functions as an outlet control valve. The outlet control valve body 100 is coupled to the solenoid portion by the rod 80.

When the control valve CV3 functions as an outlet control valve, the force f2 of the spring 78 acts against the electromagnetic force F2. The resultant (F2-f2) acts against the force F1, which is based on the pressure difference. Thus, when current is supplied to the coil 79, the position of the outlet valve body 100 relative to the valve seat 101 is determined such that the resultant (F2-f2) is equalized with the force F1. That is, the outlet valve body 100 changes the opening sizes of the bleeding passage 27 and the pressure introduction passage 72. Accordingly, the flow rate of refrigerant gas released from the crank chamber 5 through the bleeding passage 27 is changed. The crank pressure Pc is adjusted according to the relationship between the flow rate of gas flowing out of the crank chamber 5 and the flow rate of blowby gas.

The opening size of the control valve CV3 is determined by the equilibrium of the force F1 and the upward force (F2-f2) of the solenoid portion. The electromagnetic force F2 is electrically adjusted. Accordingly, the target value of the force F1 is adjusted. The force F1 represents the pressure difference $\Delta P(t)$ between the pressures PsH and PsL. The electromagnetic force F2 defines a desired pressure difference TPD in accordance with the value of current supplied to the coil 79. The solenoid portion, the drive circuit 61 and the controller 60 function as changing means for changing the target pressure difference TPD. The control valve CV3 functions as an outlet control valve for changing the target pressure difference TPD based on a current that is supplied to the coil 79 from another location.

In the embodiment of FIGS. 17 and 18, the displacement control means includes at least the controller 60 and the control valve CV3. The controller 60 controls the control valve CV3 in substantially the same manner as in the embodiment of FIG. 14.

The control valve CV3 has substantially the same advantages as the control valve CV2 shown in FIGS. 11 to 14.

An outlet control valve CV4 according to a sixth embodiment will now be described with reference to FIG. 19. The control valve CV4 includes a valve chamber 86 defined in a valve housing 85, a communication passage 87 and a pressure sensing chamber 88. The valve chamber 86 is connected to the crank chamber 5 through the bleeding passage 27. The communication passage 87 is connected to the suction chamber 21 by the bleeding passage 27. A valve body 96 is located in the valve chamber 86 to contact a valve seat 91. The valve body 96 selectively connects the valve chamber 86 with the communication passage 87. Thus, the valve chamber 86 and the communication passage 87 form a part of the bleeding passage 27.

The valve body 96 is coupled to a movable wall 92 by a small diameter rod 97. The valve body 96, the rod 97 and the movable wall 92 move integrally in the axial direction (in the lateral direction in FIG. 19). The movable wall 92 divides the pressure sensing chamber 88 into a P1 pressure chamber 93 and a P2 pressure chamber 94. The P1 pressure chamber 93 is closer to the valve chamber 86 than the P2 pressure chamber 94. A force F1 based on the pressure difference between the points P1 and P2 moves the movable wall 92 away from the valve chamber 86 (to the right as viewed in FIG. 19). The pressure sensing chamber 88, the movable wall 92, the P1 pressure chamber 93 and the P2 pressure chamber 94 form a mechanical pressure difference detector.

The valve body 96 is elastically coupled to an actuator M2 by a spring. The actuator M2 applies a force F2, which is opposite to the force F1, to the valve body 96. The actuator M2 is, for example, an electromagnetic solenoid type actuator as shown in FIG. 14, and the force F2 is changed by the controller 60. The actuator M2, the drive circuit 61 and the controller 60 form changing means for changing the target pressure difference TPD from another location.

Figure 19:
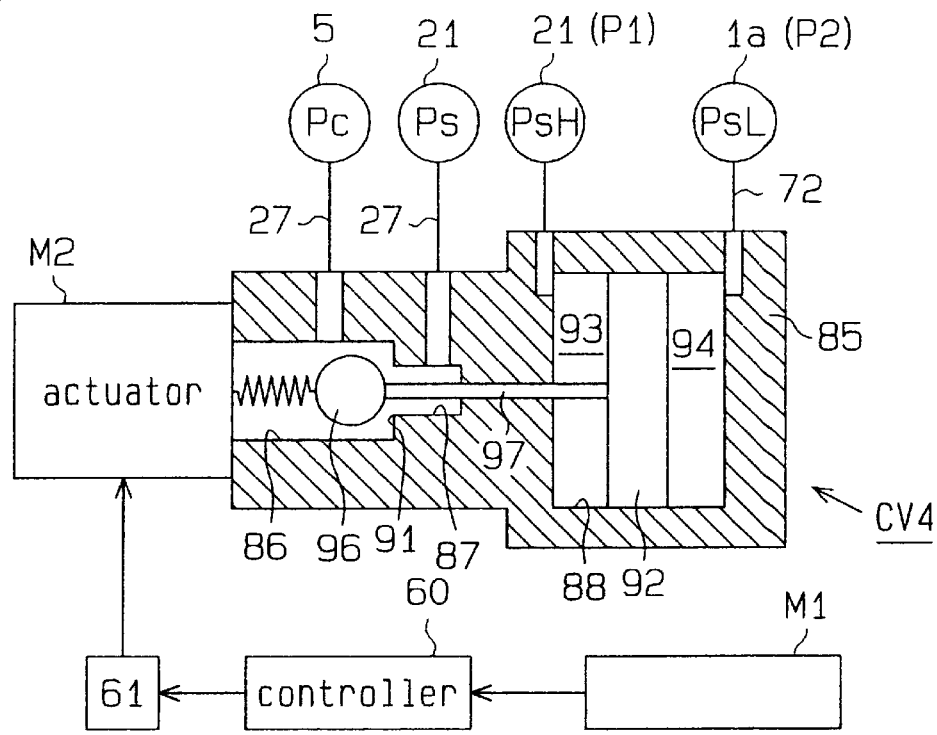
FIG. 19 is a cross-sectional view illustrating a displacement control valve according to a sixth embodiment.

The control valve CV4 shown in FIG. 19 controls the compressor displacement to maintain the compartment temperature under normal conditions. Also, the control valve CV4 of FIG. 19 quickly changes the compressor displacement under specific conditions.

Figure 20:
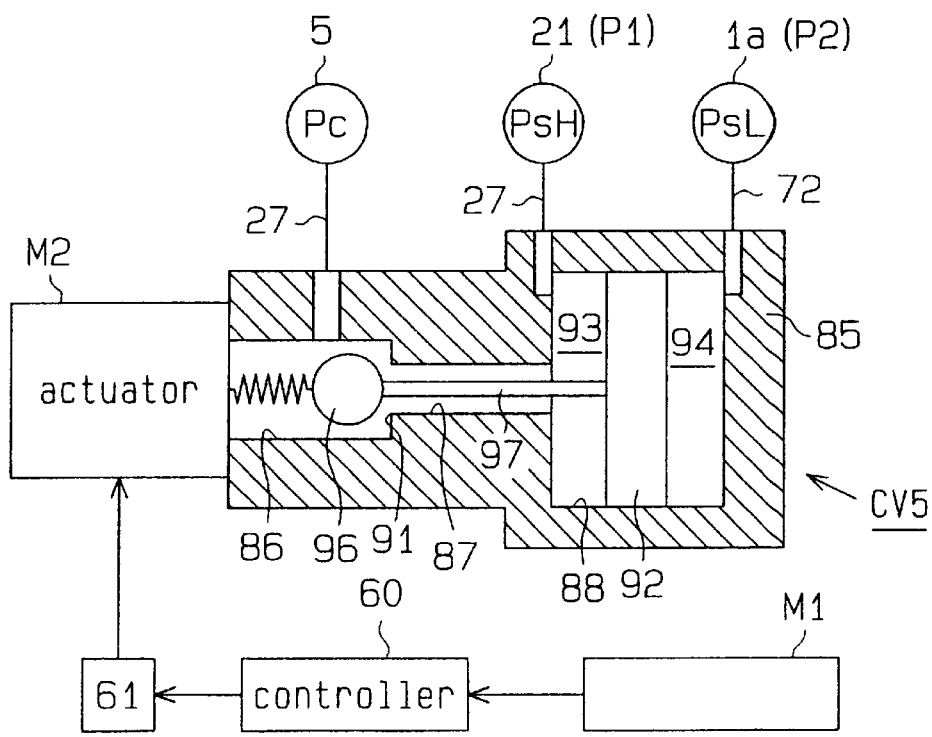
FIG. 20 is a cross-sectional view illustrating a displacement control valve according to a seventh embodiment.

A control valve CV5 according to a seventh embodiment will now be described with reference to FIG. 20. A communication passage 87 is always connected to a P1 pressure chamber 93. A valve chamber 86, the communication passage 87 and the P1 pressure chamber 93 form a part of the bleeding passage 27. The control valve CV5 of FIG. 20 has the same advantages as the control valve CV4 of FIG. 19. The number of ports formed in the valve housing of the valve CV5 is one less than that of the valve CV4.

It should be apparent to those skilled in the art that the present invention may be embodied in many other specific forms without departing from the spirit or scope of the invention. Particularly, it should be understood that the invention may be embodied in the following forms.

In the control valves shown in FIGS. 14, 16, 17, 19 and 20, the pressure monitoring points P1, P2 may be located in the pipe 35 shown in FIG. 3 or in the pipe 56 shown in FIG. 27. The pressure at each point P1, P2 may be applied to the P1 pressure chamber 93 and the P2 pressure chamber 94, respectively.

Figure 21:
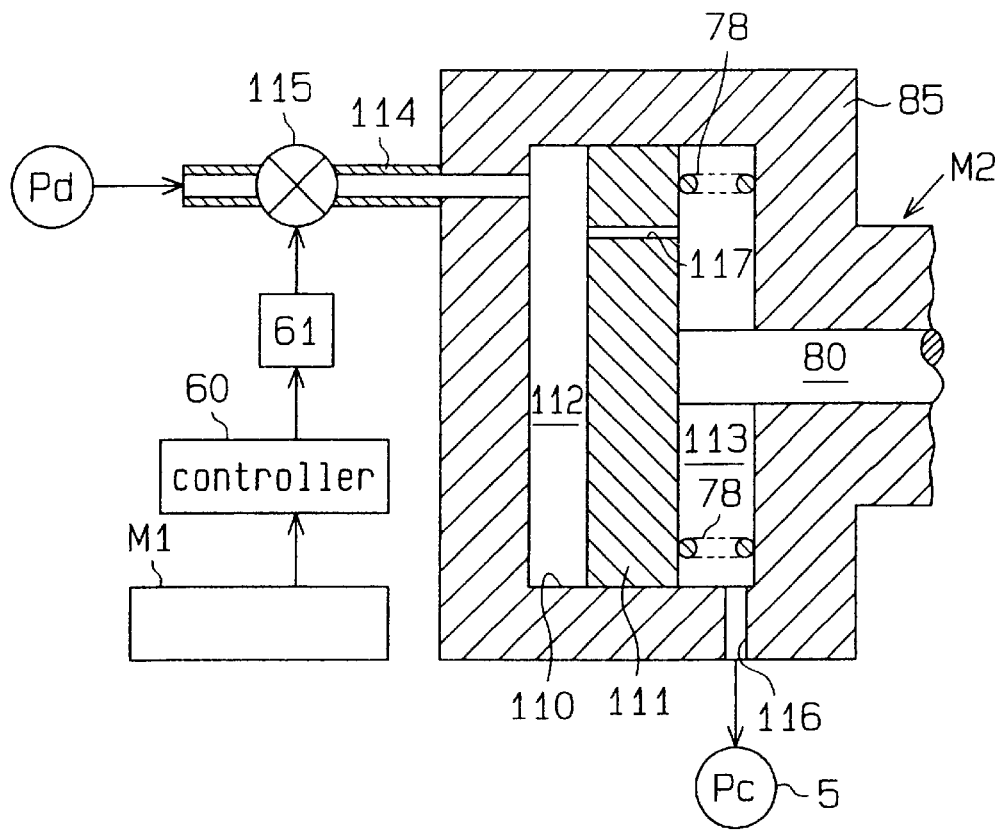
FIG. 21 is a cross-sectional view illustrating an actuator according to an eighth embodiment.
Figure 22:
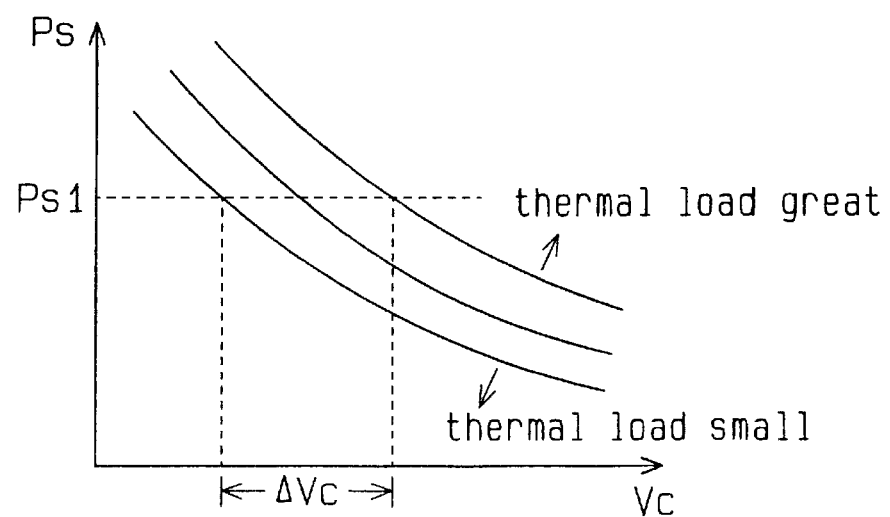
FIG. 22 is a graph showing the relationship between the suction pressure and the displacement of a prior art compressor.

FIG. 21 illustrates an actuator M2 according to an eighth embodiment. The actuators M2 shown in FIGS. 14 to 20, which are electrically driven, may be replaced by the actuator M2 of FIG. 21. The actuator M2 of FIG. 21 has spool 111 and is driven by pressure. The actuator M2 of FIG. 21 has an actuation chamber 110 defined in a valve housing 85. The spool 111 is located in the actuation chamber 110. The spool 111 is coupled to a rod 80 to move axially with the rod 80. The spool 111 divides the actuation chamber 110 into a high pressure chamber 112 and a low pressure chamber 113.

The high pressure chamber 112 is connected to a zone of the discharge pressure Pd (for example, the discharge chamber 22) by a passage 114. A valve 115 is located in the passage 114. The valve 115 is controlled by the controller 60. The low pressure chamber 113 is always connected to the crank chamber 5 (a zone of the crank pressure Pc) by a port 116. A spring 78 is located in the low pressure chamber 113 to urge the spool 111 toward the high pressure chamber 112. A throttle passage 117 is formed in the spool 111 to connect the high pressure chamber 112 with the low pressure chamber 113.

When the rod 80 needs to be moved rightward as viewed in FIG. 21, the controller 60 commands the drive circuit 61 to open the valve 115 for a certain period. This permits gas from the discharge pressure Pd to flow into the high pressure chamber 112. The gas then flows from the high pressure chamber 112 to the low pressure chamber 113 through the throttle passage 117. Accordingly, the pressure in the chamber 112 is different from the pressure in the chamber 113. A force generated by the pressure difference is greater than the force of the spring 78 and thus moves the spool 111 and the rod 80 rightward as viewed in FIG. 21. When the valve 115 is closed, the gas in the high pressure chamber 112 flows to the crank chamber 5 through the throttle passage 117 and the low pressure chamber 113. As gas flows from the high pressure chamber 112 to the low pressure chamber 113, the spool 111 is returned to the initial position by the force of the spring 78. The position of the spool 111 and the rod 80 is determined such that the force acting on the rod 80, the force based on the pressure difference between the chambers 112 and 113 and the force of the spring 78 are equal.

Figure 23:
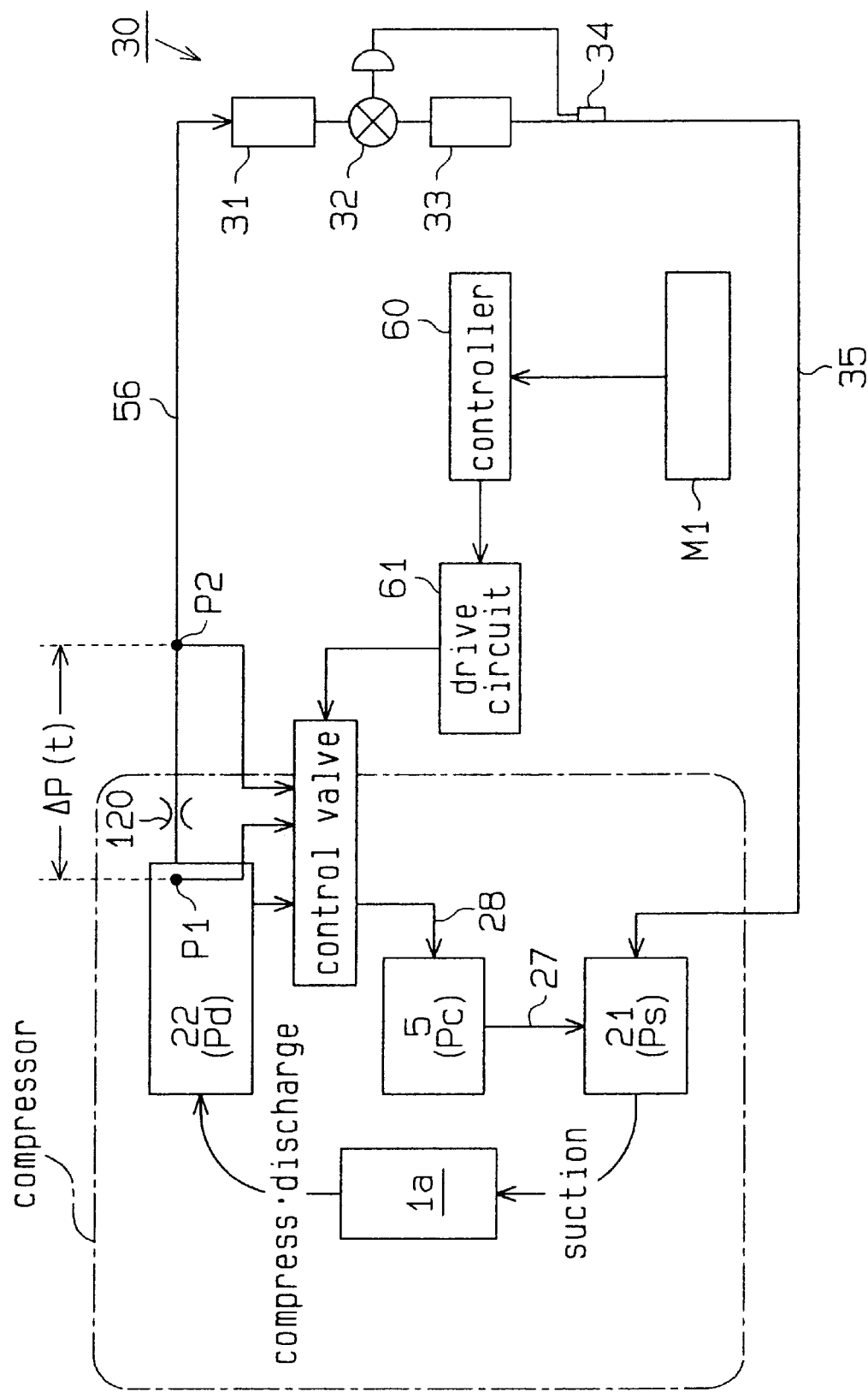
FIG. 23 is a schematic diagram illustrating a refrigeration circuit according to a ninth embodiment.

FIG. 23 illustrates a cooling circuit according to a ninth embodiment. In this embodiment, a first pressure monitoring point P1 is located in a discharge chamber 22 of a variable displacement compressor CM, and a second pressure monitoring point P2 is located in a pipe 56. The point P2 is spaced apart from the point P1 by a predetermined distance. A throttle 120 is located between the points P1 and P2. The throttle 120 increases the pressure difference between the points P1 and P2 and facilitates control based on the pressure difference ΔP(t).

Figure 24:
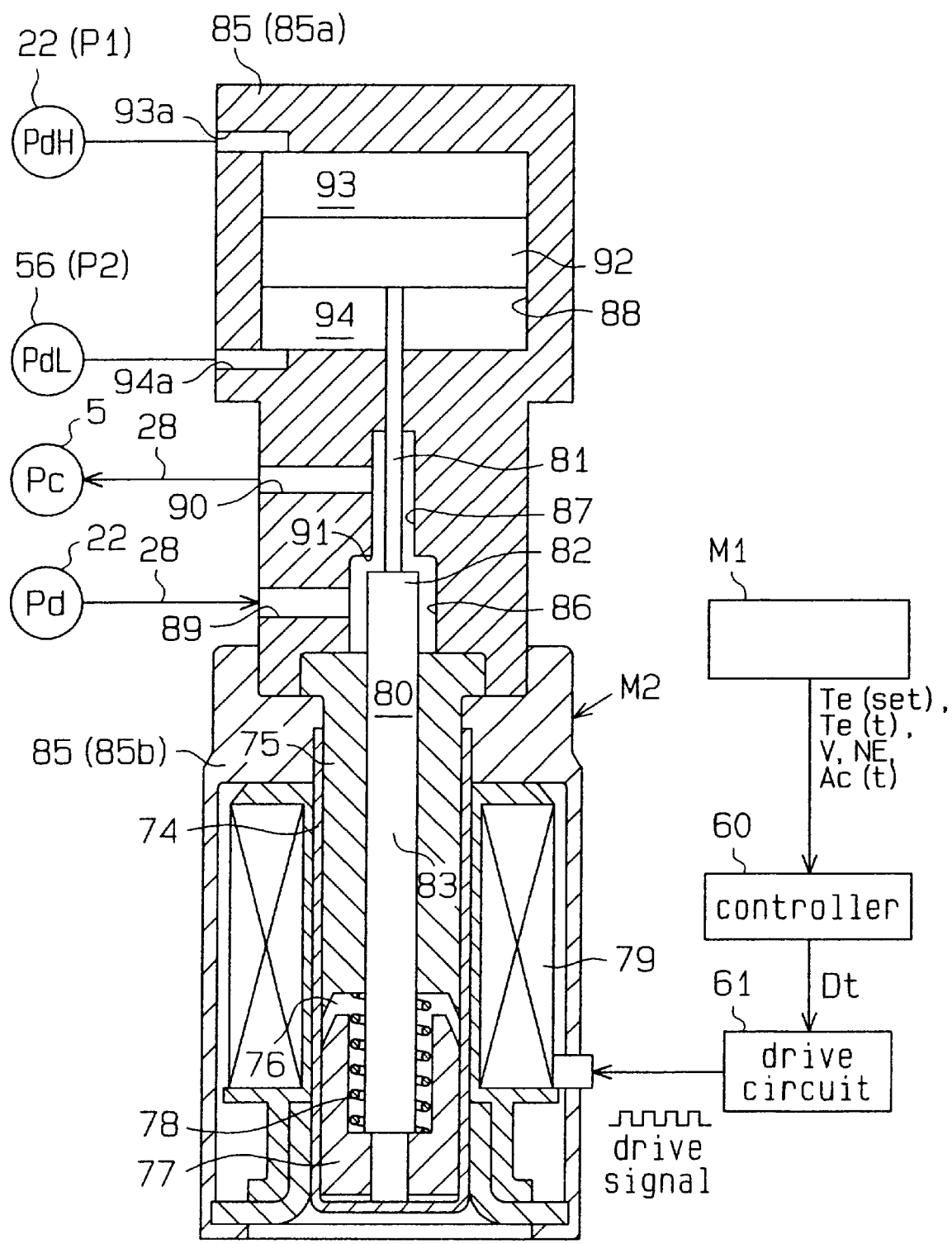
FIG. 24 is a cross-sectional view illustrating a displacement control valve used in the circuit shown in FIG. 23.

FIG. 24 illustrates a control valve in the circuit of FIG. 23. The control valve of FIG. 24 has substantially the same structure as the control valve CV2 of FIG. 14. The P1 pressure chamber 93 is exposed to the pressure at the point P1, which is referred to a pressure PdH. The P2 pressure chamber 94 is exposed to the pressure at the point P2, which is referred to the pressure PdL. The movable wall 92 is moved in the same manner as the movable wall 92 of the control valve CV2 shown in FIG. 14 in accordance with the pressure difference ΔP(t)(ΔP(t)=PdH−PdL).

Figure 25:
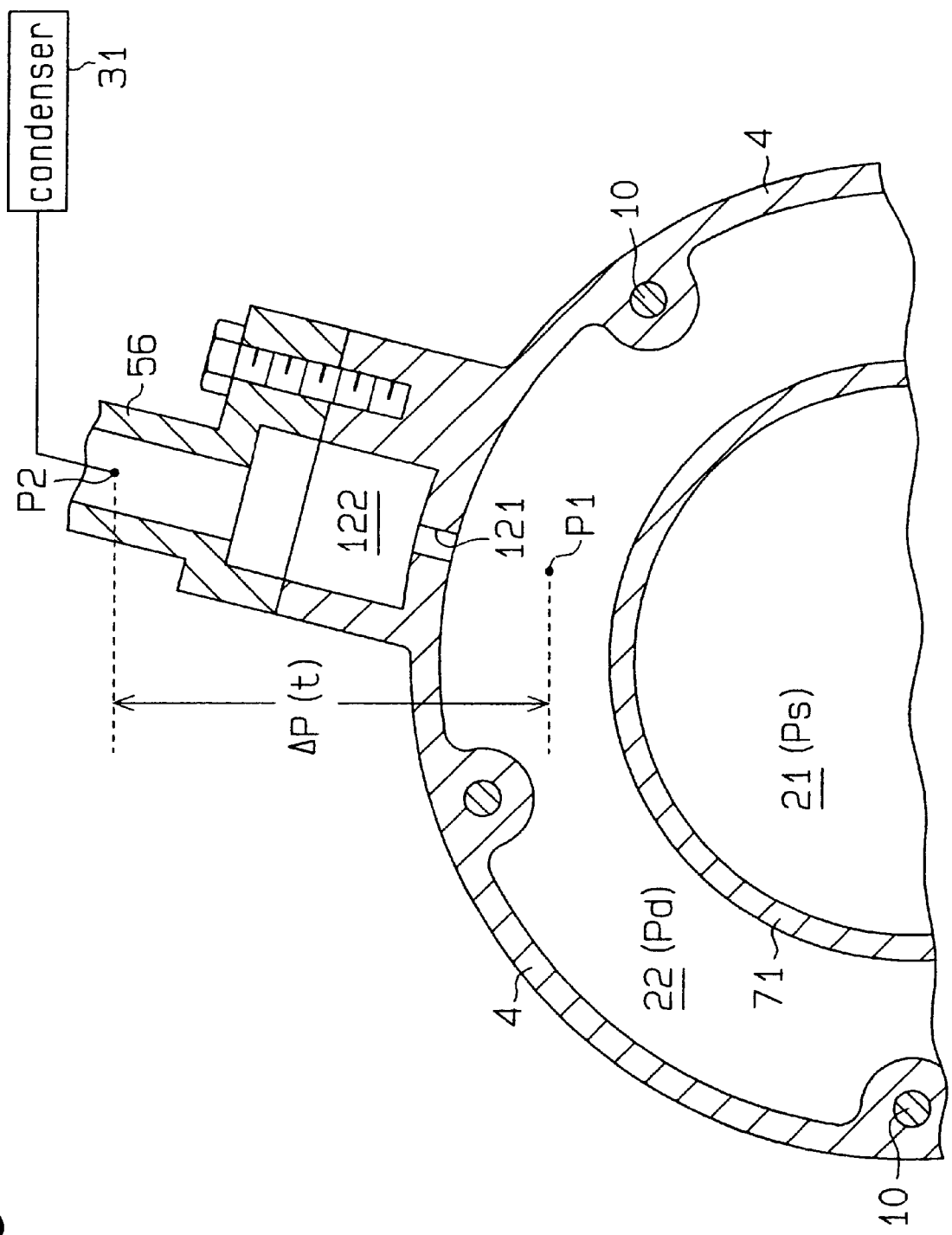
FIG. 25 is an enlarged partial cross-sectional view illustrating a compressor rear housing according to a tenth embodiment.

FIG. 25 illustrates a compressor according to a tenth embodiment. The compressor of FIG. 25 has a muffler chamber 122 located on the outer wall of the rear housing member 4 and is connected to the pipe 56. A first pressure monitoring point P1 is located in the discharge chamber 22 and a second pressure monitoring point P2 is located in the pipe 56. The points P1 and P2 are separated by a predetermined distance. A throttle 121 is formed in the rear housing member 4 to connect the muffler chamber 122 with the discharge chamber 22. The throttle 121 reduces the pulsation of the refrigerant gas exiting from the cylinder bores 1a to the discharge chamber 22. Accordingly, the pulsation of gas flow in the pipe 56 is eliminated or reduced.

Figure 26:
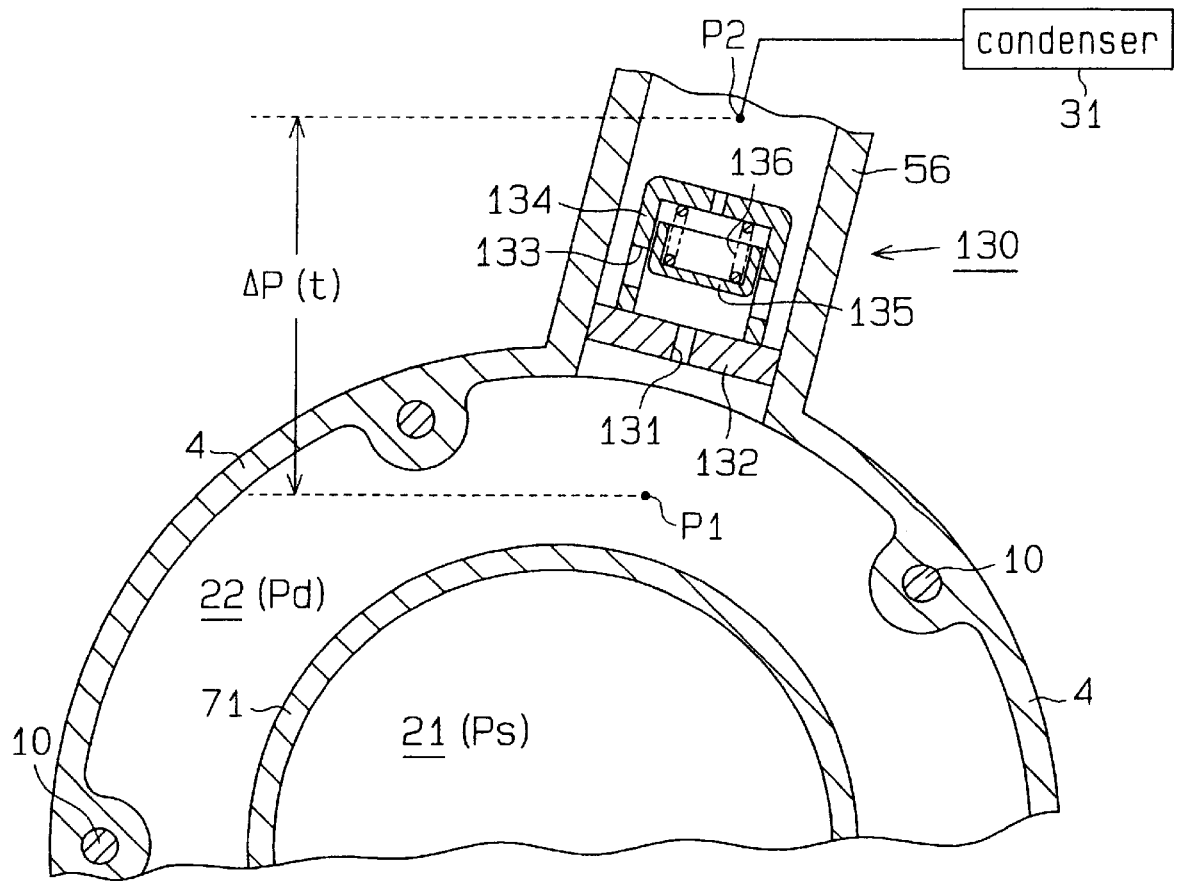
FIG. 26 is an enlarged partial cross-sectional view illustrating a compressor rear housing according to an eleventh embodiment.

FIG. 26 illustrates a compressor according to an eleventh embodiment. The locations of the pressure monitoring points P1, P2 are the same as those of the embodiment of FIG. 25. In this embodiment, a check valve mechanism 130 is located between the compressor and the pipe 56. Specifically, the check valve mechanism 130 is located between the condenser 31 and the rear housing member 4. The check valve mechanism 130 includes a valve seat 132 and a cylindrical case 134, a valve body 135 and a spring 136. The valve seat 132 has a valve hole 131. The case 134 has communication holes 133. The valve body 135 separates from and contacts the valve seat 132. The spring 136 urges the valve body 135 in a direction closing the valve hole 13.

The valve hole 131, the interior of the case 134 and the communication holes 133 form a passage to connect the discharge chamber 22 with the pipe 56. The valve hole 131 functions as a throttle located in the passage connecting the discharge chamber 22 with the pipe 56. The valve hole 131 corresponds to the throttle 121 shown in FIG. 25. The position of the valve body 135 relative to the valve seat 132 is determined by the equilibrium of a force based on the pressure difference between the pressure monitoring points P1 and P2 and the force of the spring 136. When the discharge pressure Pd is sufficiently high, the valve hole 131 is open. When the discharge pressure Pd is low, the valve hole 131 is closed.

The check valve mechanism 130 prevents back flow of gas from the pipe 56 to the discharge chamber 22. In a clutchless compressor, the internal mechanism, which includes drive shaft 6 and the swash plate 12, continues rotating as long as the engine E operates. Thus, some of refrigerant gas must always circulate within the compressor such that lubricant oil in the gas lubricates the moving parts. The check valve mechanism 130 does not permit gas to flow from the discharge chamber 22 to the pipe 56 until the difference between the discharge pressure Pd and the pressure in the pipe 56 exceeds a predetermined threshold value. Therefore, if the force of the spring 136 is properly selected, gas circulates within the compressor when the displacement is minimum and the discharge pressure Pd is low. Specifically, gas flows into the crank chamber 5 from the discharge chamber 22 through the control valve. Then, the gas flows from the crank chamber 5 to the discharge chamber 22 through the bleeding passage 27, the suction chamber 21 and the cylinder bores 1a. Accordingly, the moving parts are lubricated.

If the diameter of the valve hole 131 is large, the space between the valve body 135 and the valve seat 132 may function as a throttle when the opening size of the check valve mechanism 130 is small, or when the distance between the valve body 135 and the valve seat 132 is short.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An air-conditioning system having a refrigerant circuit, wherein the circuit includes a condenser, a decompression device, an evaporator and a variable displacement compressor, the system comprising:

a pressure difference detector for detecting the pressure difference between two pressure monitoring points located on the refrigerant circuit; and displacement control means, which controls the displacement of the compressor such that the flow rate of the refrigerant in the refrigerant circuit, which is estimated based on the detected pressure difference, seeks a predetermined value.

2. The air-conditioning system according to claim 1, further comprising an external information detector for detecting external information other than the pressure difference, wherein the means for controlling the displacement determines a target value of the pressure difference based on the external information and controls the displacement such that the pressure difference detected by the pressure difference detector approaches the target value.

3. The air-conditioning system according to claim 2, wherein the compressor has a drive plate, a crank chamber for accommodating the drive plate, wherein the inclination angle of the drive plate changes in accordance with the pressure in the crank chamber to vary the displacement of the compressor, and wherein the means for controlling the displacement comprises:

a control valve, the opening size of which is changed in accordance with an external command to adjust the crank pressure; and a controller electrically connected to the pressure difference detector and the external information detector, wherein the controller receives an information from the detectors and supplies the control valve with the external command based on the information.

4. The air-conditioning system according to claim 2, wherein the compressor has a drive plate, a crank chamber for accommodating the drive plate, wherein the inclination angle of the drive plate changes in accordance with the pressure in the crank chamber to vary the displacement of the compressor, wherein the pressure difference detector includes a pressure sensing member, which moves in accordance with the pressure difference, wherein the means for controlling displacement comprises:

a control valve having the pressure sensing member, wherein the control valve changes its opening size by the sensing member such that the pressure difference is directed to the target value; and a controller, wherein the controller determines the target value of the pressure difference based on the external information detected by the means for detecting external information detector.

5. The air-conditioning system according to claim 1, wherein the compressor has a suction pressure zone, wherein the pressure monitoring points are located in the refrigerant circuit between the evaporator and the suction pressure zone.

6. The air-conditioning system according to claim 1, wherein the compressor has a discharge pressure zone, wherein the pressure monitoring points are located in the refrigerant circuit between the condenser and the discharge pressure zone.

7. The air-conditioning system according to claim 4, wherein the compressor has a discharge pressure zone, wherein the pressure monitoring points are located in the refrigerant circuit between the condenser and the discharge pressure zone.

8. The air-conditioning system according to claim 1, wherein the pressure monitoring points are located in the compressor.

9. The air-conditioning system according to claim 5, wherein the compressor has a suction chamber, which forms the suction pressure zone, a cylinder bore and a piston, which is accommodated in the cylinder bore, wherein the piston reciprocates in the cylinder bore, wherein one of the two pressure monitoring points is located in the suction chamber and the other pressure monitoring point is located in the cylinder bore, and wherein the pressure difference is detected when the piston is performing a suction stroke.

10. The air-conditioning system according to claim 9, wherein the compressor includes a housing and a pressure introduction passage formed in the housing, wherein the pressure introduction passage communicates the cylinder bore with the pressure difference detector, and wherein the pressure introduction passage is open during the suction stroke and is closed during a discharge stroke of the piston.

11. The air-conditioning system according to claim 2, wherein the means for controlling the displacement selects a control mode from a normal displacement control mode and a specific displacement control mode, wherein each mode is selected according to the external information, wherein, when the normal displacement control mode is selected, the means for controlling the displacement determines a target value of the pressure difference based on the cooling load of the refrigerant circuit, wherein, when the specific displacement control mode is selected, the means for controlling the displacement sets the displacement of the compressor to a predetermined specific displacement.

12. The air-conditioning system according to claim 2, wherein the external information detector has a temperature sensor for detecting a temperature that reflects the temperature of a vehicle passenger compartment, which is cooled by the refrigerant system, and a temperature adjuster for adjusting the target temperature, wherein the means for controlling the displacement determines the target value based on a comparison between the temperature detected by the temperature sensor and the target temperature adjusted by the temperature adjuster.

13. The air-conditioning system according to claim 11, wherein the external information detector has a pedal position sensor to detect a depression amount of an acceleration pedal of a vehicle in which the air-conditioning system is installed, wherein the means for controlling the displacement selects one of the control modes based on the detected pedal position.

14. The air-conditioning system according to claim 13, wherein, the means for controlling the displacement judges whether the engine load is relatively great, and when the engine load is relatively great, the means for controlling the displacement minimizes the displacement of the compressor.

15. The air-conditioning system according to claim 13, wherein the means for controlling the displacement judges whether the engine load is relatively small, and wherein, when the engine load is relatively small, the means for controlling the displacement maximizes the displacement of the compressor.

16. The air-conditioning system according to claim 11, wherein, when the control mode is changed from the specific displacement control mode to the normal displacement control mode, the means for controlling the displacement gradually restores the displacement of the compressor to a displacement that was produced immediately before the specific displacement control was started.

17. The air-conditioning system according to 16, wherein, when restoring the displacement of the compressor to the displacement that was produced immediately before the specific displacement control was started, the means for controlling the displacement continuously changes the displacement.

18. The air-conditioning system according to claim 1, further comprising means for increasing the pressure difference is located between the pressure monitoring points.

19. The air-conditioning system according to claim 18, wherein the means for increasing the pressure difference includes a fixed restrictor located between the pressure monitoring points.

20. The air-conditioning system according to claim 18, wherein the means for increasing the pressure difference includes a check valve mechanism located between the pressure monitoring points.

21. A method for controlling the displacement of a variable displacement compressor in a refrigerant circuit of a vehicle air-conditioning system, the method comprising:

selecting a control mode from a plurality of modes including a normal displacement control mode and a specific displacement control mode;

changing the displacement of the compressor such that the pressure difference between two pressure monitoring points, which are located in the refrigerant circuit, approaches a target pressure difference that reflects the temperature of a passenger compartment when the normal displacement control mode is selected; and controlling the compressor to have a predetermined displacement when the specific displacement control is selected.

22. A control valve used for a variable displacement compressor, wherein the compressor is a part of a refrigerant circuit, and wherein the compressor includes a crank chamber, a drive plate accommodated in the crank chamber, a supply passage for connecting a discharge pressure zone to the crank chamber, and a bleed passage for connecting a suction pressure zone to the crank chamber, wherein the inclination angle of the drive plate varies in accordance with the pressure in the crank chamber thereby controlling the displacement of the compressor, the control valve comprising:

a valve housing;

a valve chamber defined in the valve housing to form part of the supply passage or the bleed passage;

a movable valve body located in the valve chamber to adjust opening size of the supply passage or the bleed passage;

a pressure difference detector for detecting the pressure difference between two pressure monitoring points located in the refrigerant circuit, wherein the position of the valve body is affected by a force produced by the detected pressure difference; and an actuator for applying a force to the pressure difference detector, wherein the actuator changes a target pressure difference according to the external command.

23. The control valve according to claim 22, wherein the pressure difference detector comprises:

a pressure sensing chamber defined in the valve housing; and a dividing member coupled to the valve body, wherein dividing member divides the pressure sensing chamber into two pressure chambers, wherein each pressure monitoring point is located in one of the pressure chambers.

24. The control valve according to claim 23, wherein the dividing member is a movable wall that moves axially in the valve housing.

25. The control valve according to claim 23, wherein one of the pressure chambers forms part of the bleed passage, and wherein a valve body is located in the pressure chamber that forms part of the bleed passage and is connected to the dividing member.

26. The control valve according to claim 22, wherein the compressor has a suction chamber, which forms the suction pressure zone, a cylinder bore, and a piston, which is accommodated in the cylinder bore, wherein one of the two pressure monitoring points is located in the suction chamber, and the other pressure monitoring point is located in the cylinder bore, and wherein the pressure difference is detected when the piston is performing a suction stroke.

27. The control valve according to claim 22, wherein the actuator has a solenoid to change an electromagnetic force in accordance with the value of electric current supplied to the solenoid.

28. The control valve according to claim 27, further comprising force means for urging the valve body, wherein, when no electric current is supplied to the solenoid, the force means urges the valve body in a direction increasing the pressure of the crank chamber.

29. The control valve according to claim 22, wherein, when the detected pressure difference deviates from the target pressure difference, the pressure difference detector moves the valve body to change the opening size of the supply passage or the bleed passage for controlling the displacement of the compressor such that the deviation is eliminated.

30. The control valve according to claim 29, wherein the valve body is located in the supply passage, and wherein the pressure difference detector moves the valve body to increase the opening size of the supply passage when the detected pressure difference increases.

31. The control valve according to claim 22, wherein the pressure monitoring points are located in the refrigerant circuit between a condenser and the discharge pressure zone.

* * * * *